US009892532B2

(12) United States Patent
Yamane

(10) Patent No.: US 9,892,532 B2
(45) Date of Patent: Feb. 13, 2018

(54) APPARATUS AND METHOD FOR GENERATING A SHORTEST-PATH TREE IN A GRAPH

(71) Applicant: FUJITSU LIMITED, Kawasaki-shi, Kanagawa (JP)

(72) Inventor: Yasuo Yamane, Machida (JP)

(73) Assignee: FUJITSU LIMITED, Kawasaki (JP)

( * ) Notice: Subject to any disclaimer, the term of this patent is extended or adjusted under 35 U.S.C. 154(b) by 255 days.

(21) Appl. No.: 14/823,380

(22) Filed: Aug. 11, 2015

(65) Prior Publication Data

US 2016/0055660 A1 Feb. 25, 2016

(30) Foreign Application Priority Data

Aug. 25, 2014 (JP) ................................. 2014-170430
May 1, 2015 (JP) ................................. 2015-094400

(51) Int. Cl.
*G06T 11/20* (2006.01)
*H04L 12/721* (2013.01)
(Continued)

(52) U.S. Cl.
CPC .......... *G06T 11/206* (2013.01); *H04L 45/124* (2013.01); *G06F 3/0481* (2013.01);
(Continued)

(58) Field of Classification Search
CPC ...... G06T 11/206; G06T 11/20; G06F 3/0481; G06F 17/246; H04L 41/22
See application file for complete search history.

(56) References Cited

U.S. PATENT DOCUMENTS 4,873,517 A * 10/1989 Baratz ..................... H04L 45/00
370/236
6,252,856 B1 * 6/2001 Zhang ..................... H04L 12/185
370/254

(Continued)

FOREIGN PATENT DOCUMENTS

JP    2003-271659    9/2003
JP    2011-259321    12/2011

(Continued)

OTHER PUBLICATIONS

T.M.Chan, "All-Pairs Shortest Paths for Unweighted Undirected Graphs in a(mn) Time", SODA '06 Proceedings of the seventeenth annual ACM-SIAM symposium on Discrete algorithm, pp. 514-pp. 523, 2006.

(Continued)

Primary Examiner — Abderrahim Merouan
(74) Attorney, Agent, or Firm — Staas & Halsey LLP

(57) ABSTRACT

An apparatus generates, for each of vertices in a graph represented by the vertices and edges connecting the vertices, a first shortest-path tree rooted at a first root vertex equal to the each vertex, where the first shortest-path tree represents shortest paths from the first root vertex to vertices. The apparatus generates a vertex in the first shortest path tree whose distance from the first root vertex is a natural number of N, based on searching for one or more child vertices of a vertex within a second shortest-path tree rooted at a second root vertex adjacent to the first root vertex whose distance from the first root vertex is N−1, where the vertex for searching is included in both the first shortest-path tree and the second shortest-path tree.

18 Claims, 35 Drawing Sheets

(51) Int. Cl.
*H04L 12/24* (2006.01)
*G06F 17/24* (2006.01)
*G06F 3/0481* (2013.01)
*H04L 12/753* (2013.01)

(52) U.S. Cl.
CPC ............ *G06F 17/246* (2013.01); *G06T 11/20* (2013.01); *H04L 41/22* (2013.01); *H04L 45/48* (2013.01)

(56) References Cited

U.S. PATENT DOCUMENTS

| | | | |
|---|---|---|---|
| 7,327,683 B2* | 2/2008 | Ogier | H04L 1/1614 370/236 |
| 7,362,709 B1* | 4/2008 | Hui | H04L 45/00 370/221 |
| 9,057,746 B1* | 6/2015 | Houlette | G06Q 50/06 |
| 2006/0085397 A1 | 4/2006 | D'Urso | |
| 2008/0267116 A1* | 10/2008 | Kang | H04L 45/20 370/328 |
| 2009/0063211 A1* | 3/2009 | Campo | G06Q 10/10 705/7.27 |
| 2010/0086306 A1* | 4/2010 | D'Alessandro | H04L 45/12 398/79 |
| 2010/0284309 A1* | 11/2010 | Allan | H04L 45/00 370/256 |
| 2011/0295784 A1* | 12/2011 | Wang | C12Q 1/6874 706/13 |
| 2013/0028070 A1* | 1/2013 | Beheshti-Zavareh | H04L 45/22 370/217 |
| 2013/0132309 A1* | 5/2013 | Kvernvik | G06N 99/005 706/12 |
| 2014/0032490 A1 | 1/2014 | Hido et al. | |
| 2014/0226491 A1* | 8/2014 | Jain | H04L 45/122 370/238 |
| 2015/0124810 A1* | 5/2015 | Hao | H04L 45/16 370/390 |
| 2015/0146655 A1* | 5/2015 | Hui | H04W 40/02 370/329 |

FOREIGN PATENT DOCUMENTS

| | | |
|---|---|---|
| JP | 2012-27938 | 2/2012 |
| JP | 2013-45326 | 3/2013 |
| WO | WO 2011/001806 A1 | 1/2011 |

OTHER PUBLICATIONS

R, Seidel, "On the All-Pairs-Shortest-Path Problem in Unweighted Undirected Graphs", Journal of Computer and System Sciences, 51.400-403, 1995.
Z. Galil and O. Margalit, "All Pairs Shortest Distances for Graphs with Small Integer Length Edges", Information and Computation, 134, 103-139, 1997.
Z. Galil and O. Margalit, "All Pairs Shortest Paths for Graphs with Small Integer Length Edges", Jornal of Computer and System Sciences 54, 243-254, 1997.
Spanning_tree-Wikipedia, [Online], Search on Jul. 1, 2014, Internet <URL: http://ja.wikipedia.org/wiki/%E5%85%A8%E5%9F%9F%E6%9C%A8> with English Translation.
Dijkstra's_algorithm-Wikipedia, [Online], Search on Jul. 1, 2014, Internet <URL: http://ja.wikipedia.org/wiki/%E3%83%80%E3%82%A4%E3%82%AF%E3%82%B9%E3%83%88%E3%83%A9%E6%B3%95> with English Translation.
Breadth-first_search-Wikipedia, [Online], Search on Jul. 1, 2014, Internet <URL: http://ja.wikipedia.org/wiki/%E5%B9%85%E5%84%AA%E5%85%88%E6%8E%A2%E7%B4%A2> with English Translation.

* cited by examiner

| id | 1 |
|---|---|
| adj_vertices | [$v_2$] |
| sptree_depth | 0 |
| sptree | t_$v_{11}$ |
| sptree_closure | {(1, t_$v_{11}$)} |
| ring[0] | [t_$v_{11}$] | t_$v_{11}$ — 61A

| vertex | $v_1$ |
|---|---|
| children | [ ] |
| parent | |
| original | |

$v_2$ — 60B

| id | 2 |
|---|---|
| adj_vertices | [$v_1$, $v_3$] |
| sptree_depth | 0 |
| sptree | t_$v_{22}$ |
| sptree_closure | {(2, t_$v_{22}$)} |
| ring[0] | [t_$v_{22}$] | t_$v_{22}$ — 61B

| vertex | $v_2$ |
|---|---|
| children | [ ] |
| parent | |
| original | |

$v_3$ — 60C

| id | 3 |
|---|---|
| adj_vertices | [$v_2$, $v_4$] |
| sptree_depth | 0 |
| sptree | t_$v_{33}$ |
| sptree_closure | {(3, t_$v_{33}$)} |
| ring[0] | [t_$v_{33}$] | t_$v_{33}$ — 61C

| vertex | $v_3$ |
|---|---|
| children | [ ] |
| parent | |
| original | |

$v_4$ — 60D

| id | 4 |
|---|---|
| adj_vertices | [$v_3$] |
| sptree_depth | 0 |
| sptree | t_$v_{44}$ |
| sptree_closure | {(4, t_$v_{44}$)} |
| ring[0] | [t_$v_{44}$] | t_$v_{44}$ — 61D

| vertex | $v_4$ |
|---|---|
| children | [ ] |
| parent | |
| original | |

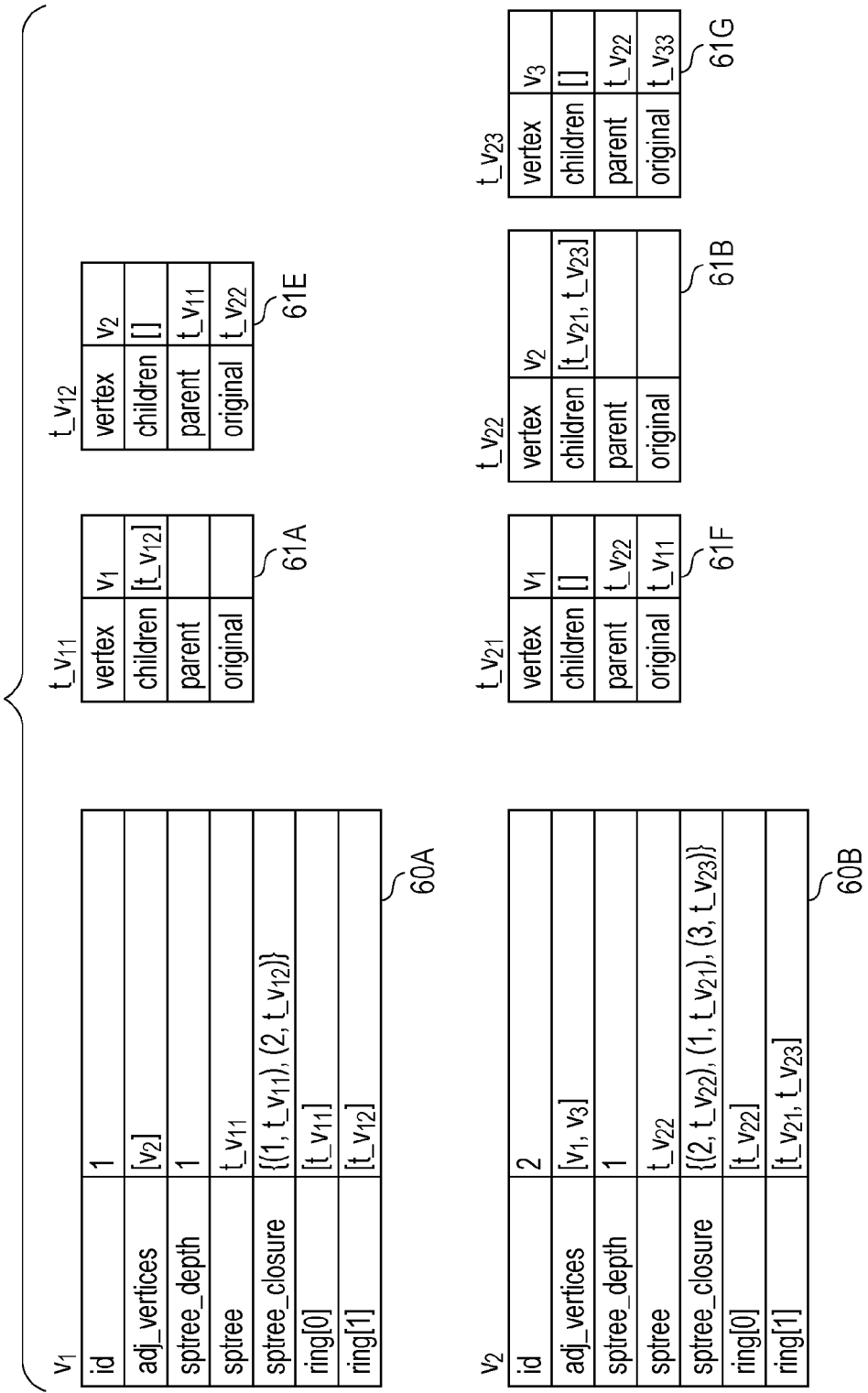

FIG. 26

| $v_3$ | |
|---|---|
| id | 3 |
| adj_vertices | [$v_2$, $v_4$] |
| sptree_depth | 1 |
| sptree | t_$v_{33}$ |
| sptree_closure | {(3, t_$v_{33}$), (2, t_$v_{32}$), (4, t_$v_{34}$)} |
| ring[0] | [t_$v_{33}$] |
| ring[1] | [t_$v_{32}$, t_$v_{34}$] |

60C

| $v_4$ | |
|---|---|
| id | 4 |
| adj_vertices | [$v_3$] |
| sptree_depth | 1 |
| sptree | t_$v_{44}$ |
| sptree_closure | {(4, t_$v_{44}$), (3, t_$v_{43}$)} |
| ring[0] | [t_$v_{44}$] |
| ring[1] | [t_$v_{43}$] |

60D

| t_$v_{32}$ | |
|---|---|
| vertex | $v_2$ |
| children | [] |
| parent | t_$v_{33}$ |
| original | t_$v_{22}$ |

61H

| t_$v_{33}$ | |
|---|---|
| vertex | $v_3$ |
| children | [t_$v_{32}$] |
| parent | |
| original | |

61C

| t_$v_{34}$ | |
|---|---|
| vertex | $v_4$ |
| children | [] |
| parent | t_$v_{33}$ |
| original | t_$v_{44}$ |

61I

| t_$v_{43}$ | |
|---|---|
| vertex | $v_3$ |
| children | [] |
| parent | t_$v_{44}$ |
| original | t_$v_{33}$ |

61J

| t_$v_{44}$ | |
|---|---|
| vertex | $v_4$ |
| children | [t_$v_{43}$] |
| parent | |
| original | |

| | $v_1$ |
|---|---|
| id | 1 |
| adj_vertices | [$v_2$] |
| sptree_depth | 2 |
| sptree | t_$v_{11}$ |
| sptree_closure | {(1, t_$v_{11}$), (2, t_$v_{12}$), (3, t_$v_{13}$)} |
| ring[0] | [t_$v_{11}$] |
| ring[1] | [t_$v_{12}$] |
| ring[2] | [t_$v_{13}$] |

~60A

| | $v_2$ |
|---|---|
| id | 2 |
| adj_vertices | [$v_1$, $v_3$] |
| sptree_depth | 2 |
| sptree | t_$v_{22}$ |
| sptree_closure | {(2, t_$v_{22}$), (1, t_$v_{21}$), (3, t_$v_{23}$), (4, t_$v_{24}$)} |
| ring[0] | [t_$v_{22}$] |
| ring[1] | [t_$v_{21}$, t_$v_{23}$] |
| ring[2] | [t_$v_{24}$] |

~60B

| t_$v_{11}$ | |
|---|---|
| vertex | $v_1$ |
| children | [t_$v_{12}$] |
| parent | |
| original | |

~61A

| t_$v_{12}$ | |
|---|---|
| vertex | $v_2$ |
| children | [t_$v_{13}$] |
| parent | t_$v_{11}$ |
| original | t_$v_{22}$ |

~61E

| t_$v_{13}$ | |
|---|---|
| vertex | $v_3$ |
| children | [] |
| parent | t_$v_{12}$ |
| original | t_$v_{23}$ |

~61K

| t_$v_{21}$ | |
|---|---|
| vertex | $v_1$ |
| children | [] |
| parent | t_$v_{22}$ |
| original | t_$v_{11}$ |

~61F

| t_$v_{22}$ | |
|---|---|
| vertex | $v_2$ |
| children | [t_$v_{21}$, t_$v_{23}$] |
| parent | |
| original | |

~61B

| t_$v_{23}$ | |
|---|---|
| vertex | $v_3$ |
| children | [t_$v_{24}$] |
| parent | t_$v_{22}$ |
| original | t_$v_{33}$ |

~61G

| t_$v_{24}$ | |
|---|---|
| vertex | $v_4$ |
| children | [] |
| parent | t_$v_{23}$ |
| original | t_$v_{34}$ |

| $v_1$ | |
|---|---|
| id | 1 |
| adj_vertices | [$v_2$] |
| sptree_depth | 3 |
| sptree | t_$v_{11}$ |
| sptree_closure | {(1, t_$v_{11}$), (2, t_$v_{12}$), (3, t_$v_{13}$), (4, t_$v_{14}$)} |
| ring[0] | [t_$v_{11}$] |
| ring[1] | [t_$v_{12}$] |
| ring[2] | [t_$v_{13}$] |
| ring[3] | [t_$v_{14}$] |

60A

| t_$v_{11}$ | |
|---|---|
| vertex | $v_1$ |
| children | [t_$v_{12}$] |
| parent | |
| original | |

61A

| t_$v_{12}$ | |
|---|---|
| vertex | $v_2$ |
| children | [t_$v_{13}$] |
| parent | t_$v_{11}$ |
| original | t_$v_{22}$ |

61E

| t_$v_{13}$ | |
|---|---|
| vertex | $v_3$ |
| children | [t_$v_{14}$] |
| parent | t_$v_{12}$ |
| original | t_$v_{23}$ |

61K

| t_$v_{14}$ | |
|---|---|
| vertex | $v_4$ |
| children | [] |
| parent | t_$v_{13}$ |
| original | t_$v_{24}$ |

61O

| $v_2$ | |
|---|---|
| id | 2 |
| adj_vertices | [$v_1$, $v_3$] |
| sptree_depth | 2 |
| sptree | t_$v_{22}$ |
| sptree_closure | {(2, t_$v_{22}$), (1, t_$v_{21}$), (3, t_$v_{23}$), (4, t_$v_{24}$)} |
| ring[0] | [t_$v_{22}$] |
| ring[1] | [t_$v_{21}$, t_$v_{23}$] |
| ring[2] | [t_$v_{24}$] |

60B

| t_$v_{21}$ | |
|---|---|
| vertex | $v_1$ |
| children | [] |
| parent | t_$v_{22}$ |
| original | t_$v_{11}$ |

61F

| t_$v_{22}$ | |
|---|---|
| vertex | $v_2$ |
| children | [t_$v_{21}$, t_$v_{23}$] |
| parent | |
| original | |

61B

| t_$v_{23}$ | |
|---|---|
| vertex | $v_3$ |
| children | [t_$v_{24}$] |
| parent | t_$v_{22}$ |
| original | t_$v_{33}$ |

61G

| t_$v_{24}$ | |
|---|---|
| vertex | $v_4$ |
| children | [] |
| parent | t_$v_{23}$ |
| original | t_$v_{34}$ |

| $v_3$ | |
|---|---|
| id | 3 |
| adj_vertices | [$v_2$, $v_4$] |
| sptree_depth | 2 |
| sptree | t_$v_{33}$ |
| sptree_closure | {(3, t_$v_{33}$), (2, t_$v_{32}$), (4, t_$v_{34}$), (1, t_$v_{31}$)} |
| ring[0] | [t_$v_{33}$] |
| ring[1] | [t_$v_{32}$, t_$v_{34}$] |
| ring[2] | [t_$v_{31}$] |

60C

| t_$v_{31}$ | |
|---|---|
| vertex | $v_1$ |
| children | [] |
| parent | t_$v_{32}$ |
| original | t_$v_{21}$ |

61M

| t_$v_{32}$ | |
|---|---|
| vertex | $v_2$ |
| children | [t_$v_{31}$] |
| parent | t_$v_{33}$ |
| original | t_$v_{22}$ |

61H

| t_$v_{33}$ | |
|---|---|
| vertex | $v_3$ |
| children | [t_$v_{32}$, t_$v_{34}$] |
| parent | |
| original | |

61C

| t_$v_{34}$ | |
|---|---|
| vertex | $v_4$ |
| children | [] |
| parent | t_$v_{33}$ |
| original | t_$v_{44}$ |

61I

| $v_4$ | |
|---|---|
| id | 4 |
| adj_vertices | [$v_3$] |
| sptree_depth | 3 |
| sptree | t_$v_{44}$ |
| sptree_closure | {(4, t_$v_{44}$), (3, t_$v_{43}$), (2, t_$v_{42}$), (1, t_$v_{41}$)} |
| ring[0] | [t_$v_{44}$] |
| ring[1] | [t_$v_{43}$] |
| ring[2] | [t_$v_{42}$] |
| ring[3] | [t_$v_{41}$] |

60D

| t_$v_{41}$ | |
|---|---|
| vertex | $v_1$ |
| children | [] |
| parent | t_$v_{42}$ |
| original | t_$v_{31}$ |

61P

| t_$v_{42}$ | |
|---|---|
| vertex | $v_2$ |
| children | [t_$v_{41}$] |
| parent | t_$v_{43}$ |
| original | t_$v_{32}$ |

61N

| t_$v_{43}$ | |
|---|---|
| vertex | $v_3$ |
| children | [t_$v_{42}$] |
| parent | t_$v_{44}$ |
| original | t_$v_{33}$ |

61J

| t_$v_{44}$ | |
|---|---|
| vertex | $v_4$ |
| children | [t_$v_{43}$] |
| parent | |
| original | |

61D

FIG. 36 v₁
| id | 1 |
|---|---|
| adj_vertices | [v₂] |
| sptree_depth | 0 |
| sptree | t_v₁₁ |
| sptree_closure | {(1, t_v₁₁)} |
| ring[0] | [t_v₁₁] |

260A t_v₁₁
| vertex | v₁ |
|---|---|
| children | [] |
| parent | |
| original | |

261A v₂
| id | 2 |
|---|---|
| adj_vertices | [v₃] |
| sptree_depth | 0 |
| sptree | t_v₂₂ |
| sptree_closure | {(2, t_v₂₂)} |
| ring[0] | [t_v₂₂] |

260B t_v₂₂
| vertex | v₂ |
|---|---|
| children | [] |
| parent | |
| original | |

261B v₃
| id | 3 |
|---|---|
| adj_vertices | [v₂, v₄] |
| sptree_depth | 0 |
| sptree | t_v₃₃ |
| sptree_closure | {(3, t_v₃₃)} |
| ring[0] | [t_v₃₃] |

260C t_v₃₃
| vertex | v₃ |
|---|---|
| children | [] |
| parent | |
| original | |

261C v₄
| id | 4 |
|---|---|
| adj_vertices | [] |
| sptree_depth | 0 |
| sptree | t_v₄₄ |
| sptree_closure | {(4, t_v₄₄)} |
| ring[0] | [t_v₄₄] |

260D t_v₄₄
| vertex | v₄ |
|---|---|
| children | [] |
| parent | |
| original | |

| t_v32 | |
|---|---|
| vertex | v2 |
| children | [] |
| parent | t_v33 |
| original | t_v22 |

261H

| t_v33 | |
|---|---|
| vertex | v3 |
| children | [t_v32, t_v34] |
| parent | |
| original | |

261C

| t_v34 | |
|---|---|
| vertex | v4 |
| children | [] |
| parent | t_v33 |
| original | t_v44 |

261I

| t_v44 | |
|---|---|
| vertex | v4 |
| children | [] |
| parent | |
| original | |

261D

| v3 | |
|---|---|
| id | 3 |
| adj_vertices | [v2, v4] |
| sptree_depth | 1 |
| sptree | t_v33 |
| sptree_closure | {(3, t_v33), (2, t_v32), (4, t_v34)} |
| ring[0] | [t_v33] |
| ring[1] | [t_v32, t_v34] |

260C

| v4 | |
|---|---|
| id | 4 |
| adj_vertices | [] |
| sptree_depth | 0 |
| sptree | t_v44 |
| sptree_closure | {(4, t_v44)} |
| ring[0] | [t_v44] |

260D

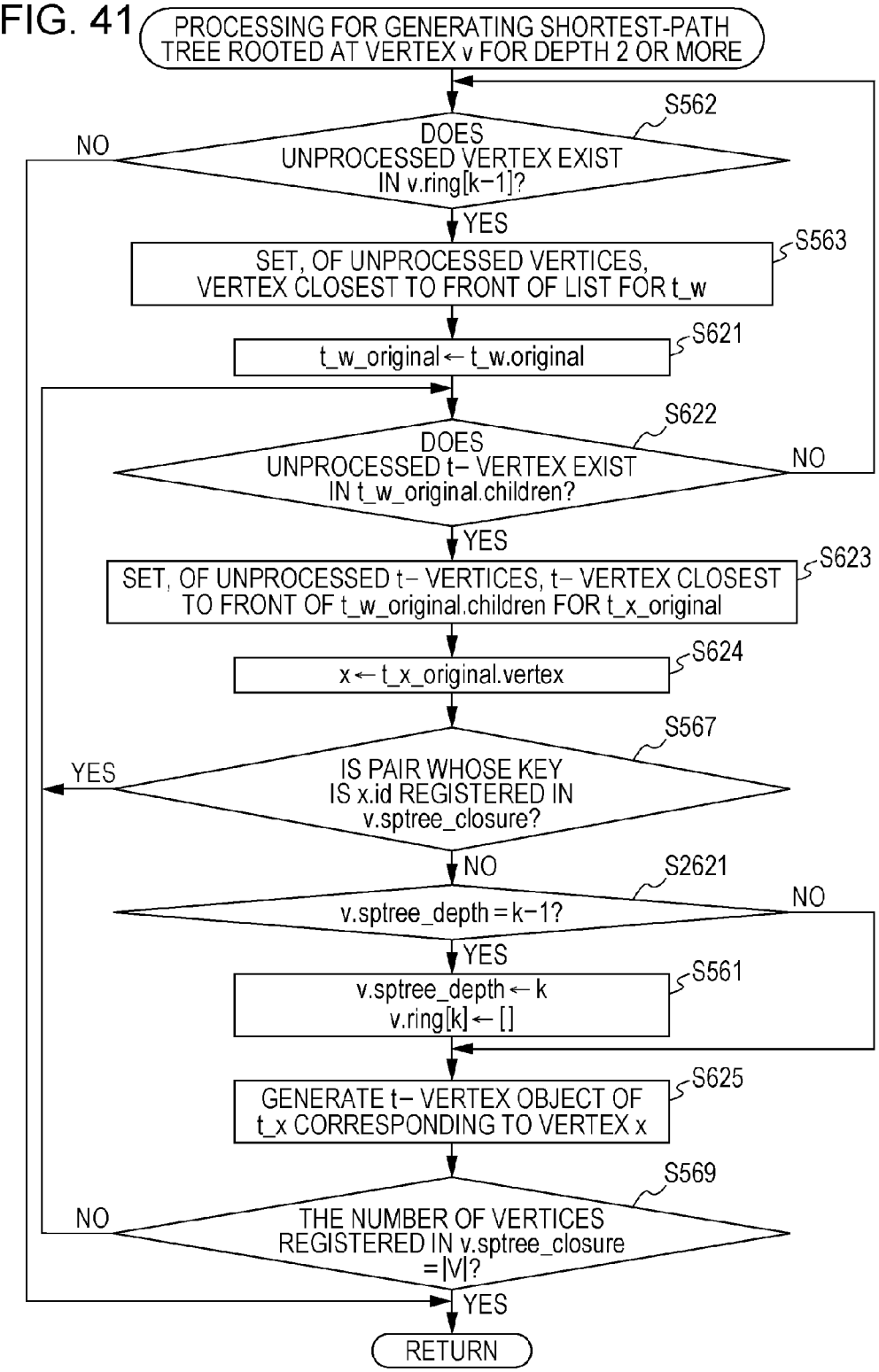

FIG. 42

| v1 | |
|---|---|
| id | 1 |
| adj_vertices | [v2] |
| sptree_depth | 2 |
| sptree | t_v11 |
| sptree_closure | {(1, t_v11), (2, t_v12), (3, t_v13)} |
| ring[0] | [t_v11] |
| ring[1] | [t_v12] |
| ring[2] | [t_v13] |

260A

| v2 | |
|---|---|
| id | 2 |
| adj_vertices | [v3] |
| sptree_depth | 2 |
| sptree | t_v22 |
| sptree_closure | {(2, t_v22), (3, t_v23), (4, t_v24)} |
| ring[0] | [t_v22] |
| ring[1] | [t_v23] |
| ring[2] | [t_v24] |

260B

| t_v11 | |
|---|---|
| vertex | v1 |
| children | [t_v12] |
| parent | |
| original | |

261A

| t_v12 | |
|---|---|
| vertex | v2 |
| children | [t_v13] |
| parent | t_v11 |
| original | t_v22 |

261E

| t_v13 | |
|---|---|
| vertex | v3 |
| children | [] |
| parent | t_v12 |
| original | t_v23 |

261K

| t_v22 | |
|---|---|
| vertex | v2 |
| children | [t_v23] |
| parent | |
| original | |

261B

| t_v23 | |
|---|---|
| vertex | v3 |
| children | [t_v24] |
| parent | t_v22 |
| original | t_v33 |

261G

| t_v24 | |
|---|---|
| vertex | v4 |
| children | [] |
| parent | t_v23 |
| original | t_v34 |

| t_v32 | |
|---|---|
| vertex | v2 |
| children | [] |
| parent | t_v33 |
| original | t_v22 |

261H

| t_v33 | |
|---|---|
| vertex | v3 |
| children | [t_v32, t_v34] |
| parent | |
| original | |

261C

| t_v34 | |
|---|---|
| vertex | v4 |
| children | [] |
| parent | t_v33 |
| original | t_v44 |

261I

| t_v44 | |
|---|---|
| vertex | v4 |
| children | [] |
| parent | |
| original | |

261D

| v3 | |
|---|---|
| id | 3 |
| adj_vertices | [v2, v4] |
| sptree_depth | 1 |
| sptree | t_v33 |
| sptree_closure | {(3, t_v33), (2, t_v32), (4, t_v34)} |
| ring[0] | [t_v33] |
| ring[1] | [t_v32, t_v34] |

260C

| v4 | |
|---|---|
| id | 4 |
| adj_vertices | [] |
| sptree_depth | 0 |
| sptree | t_v44 |
| sptree_closure | {(4, t_v44)} |
| ring[0] | [t_v44] |

| $v_1$ | |
|---|---|
| id | 1 |
| adj_vertices | [$v_2$] |
| sptree_depth | 3 |
| sptree | t_$v_{11}$ |
| sptree_closure | {(1, t_$v_{11}$), (2, t_$v_{12}$), (3, t_$v_{13}$), (4, t_$v_{14}$)} |
| ring[0] | [t_$v_{11}$] |
| ring[1] | [t_$v_{12}$] |
| ring[2] | [t_$v_{13}$] |
| ring[3] | [t_$v_{14}$] |

260A

| $v_2$ | |
|---|---|
| id | 2 |
| adj_vertices | [$v_3$] |
| sptree_depth | 2 |
| sptree | t_$v_{22}$ |
| sptree_closure | {(2, t_$v_{22}$), (3, t_$v_{23}$), (4, t_$v_{24}$)} |
| ring[0] | [t_$v_{22}$] |
| ring[1] | [t_$v_{23}$] |
| ring[2] | [t_$v_{24}$] |

260B

| t_$v_{11}$ | |
|---|---|
| vertex | $v_1$ |
| children | [t_$v_{12}$] |
| parent | |
| original | |

261A

| t_$v_{12}$ | |
|---|---|
| vertex | $v_2$ |
| children | [t_$v_{13}$] |
| parent | t_$v_{11}$ |
| original | t_$v_{22}$ |

261E

| t_$v_{13}$ | |
|---|---|
| vertex | $v_3$ |
| children | [t_$v_{14}$] |
| parent | t_$v_{12}$ |
| original | t_$v_{23}$ |

261K

| t_$v_{14}$ | |
|---|---|
| vertex | $v_4$ |
| children | [] |
| parent | t_$v_{13}$ |
| original | t_$v_{24}$ |

261O

| t_$v_{22}$ | |
|---|---|
| vertex | $v_2$ |
| children | [t_$v_{23}$] |
| parent | |
| original | |

261B

| t_$v_{23}$ | |
|---|---|
| vertex | $v_3$ |
| children | [t_$v_{24}$] |
| parent | t_$v_{22}$ |
| original | t_$v_{33}$ |

261G

| t_$v_{24}$ | |
|---|---|
| vertex | $v_4$ |
| children | [] |
| parent | t_$v_{23}$ |
| original | t_$v_{34}$ |

| t_v32 | |
|---|---|
| vertex | v2 |
| children | [] |
| parent | t_v33 |
| original | t_v22 |

261H

| t_v33 | |
|---|---|
| vertex | v3 |
| children | [t_v32, t_v34] |
| parent | |
| original | |

261C

| t_v34 | |
|---|---|
| vertex | v4 |
| children | [] |
| parent | t_v33 |
| original | t_v44 |

261I

| t_v44 | |
|---|---|
| vertex | v4 |
| children | [] |
| parent | |
| original | |

261D

| v3 | |
|---|---|
| id | 3 |
| adj_vertices | [v2, v4] |
| sptree_depth | 1 |
| sptree | t_v33 |
| sptree_closure | {(3, t_v33), (2, t_v32), (4, t_v34)} |
| ring[0] | [t_v33] |
| ring[1] | [t_v32, t_v34] |

260C

| v4 | |
|---|---|
| id | 4 |
| adj_vertices | [] |
| sptree_depth | 0 |
| sptree | t_v44 |
| sptree_closure | {(4, t_v44)} |
| ring[0] | [t_v44] |

260D

APPARATUS AND METHOD FOR GENERATING A SHORTEST-PATH TREE IN A GRAPH

CROSS-REFERENCE TO RELATED APPLICATIONS

This application is based upon and claims the benefit of priority of the prior Japanese Patent Application No. 2014-0170430, filed on Aug. 25, 2014, and the Japanese Patent Application No. 2015-094400, filed on May 1, 2015, the entire contents of which are incorporated herein by reference.

FIELD

The embodiments discussed herein are related to apparatus and method for generating a shortest-path tree in a graph.

BACKGROUND

In recent years, the number of applications utilizing network-based data has been increasing in the fields of social networking services (SNSs), customer relationship management, network management, bioengineering, transportation, and so on. The network-based data is data indicating elements and relationships between the elements. Examples of the network-based data include data indicating human relationships, relationships between molecules, and the so-called networks, such as the Internet, a communication network, a traffic network, and a transportation network.

The network-based data may also be represented by a graph including vertices corresponding to respective elements and edges connecting the vertices, the edges corresponding to relationships between related ones of the elements. For example, in a graph of network-based data indicating a human relationship, each human may be represented by a vertex as one element, and a relationship between the humans may be represented as an edge connecting the vertices.

When a set of vertices included in a graph G is represented by V, and a set of edges is represented by E, the graph G is represented as G=(V, E). Also, in a graph, two vertices connected through one edge are said to be adjacent to each other. When a vertex $v_{i-1}$ and a vertex $v_i$ are adjacent to each other in a sequence of vertices $v_0, v_1, \ldots,$ and $v_n$ for an arbitrary i (1≤i≤n), a sequence of the vertices is referred to as a "path", and the length thereof is n. In other words, a length of a path is the number of edges included in the path. The vertex $v_0$ is referred to as a "start point" of the path, and the vertex $v_n$ is referred to as an "end point" of the path. Of paths between two vertices, the path having the shortest length is referred to as a "shortest path", and the length of the shortest path between two vertices is referred to as a "distance".

Graphs like those described above are grouped into an undirected graph in which the edges are not directed and a directed graph in which the edges are directed. For example, when all roads are able to be traveled in both directions, this road network may be represented as an undirected graph. However, a road network including a one-way road is able to be represented only by a directed graph. The definitions described above are predicated on an undirected graph.

Graphs of network-based data as described above may be grouped into a weighted graph in which each edge is weighted and an unweighted graph in which each edge is not weighted. For example, a railway network may be represented as a weighted graph by associating stations with respective vertices, connecting the vertices corresponding to the adjacent stations by using edges, and giving each edge a weight corresponding to the distance between the stations. Also, for network-based data representing a human relationship, when attention is paid to only the presence/absence of a relationship and the intimacy of the relationship is not considered, the human relationship may be represented by an unweighted graph. Not only a positive value but also a negative value may be given to the weight.

Meanwhile, there are increasing demands for data analysis involving, for example, extracting information important for business, management, research, and so on from the network-based data. There are also demands for data analysis for graphs representing network-based data. For example, determining the shortest path between two vertices in a graph is important for data analysis for the graph.

Three examples in which an unweighted undirected graph is effective will be described below. For example, for network-based data representing a human relationship, a graph is conceivable in which people who are friends to each other in an SNS, people that exchange email in-house, or the like are connected to each other by using edges. Now, consider a case in which one person who is represented as a vertex in the graph wishes to access another person who has no direct relationship with that person. In this case, in the graph, when the shortest path between vertices representing the two people is known, it is possible to contact an intended person through an acquaintance corresponding to a vertex on the path with the least time and effort.

Also, in a graph representing a computer network, when the shortest path between vertices is known, communication may be performed between apparatuses corresponding to the vertices through the path with which the number of communications is the smallest.

Also, by way of example, consider a graph in which vertices correspond to respective facets of a Rubik's Cube (registered trademark) and the facets between which a transition may be made by a single turn are connected by an edge. In this case, the shortest path from the vertex corresponding to one facet to the vertex corresponding to the final facet (the state in which each of all of the faces has one color) represents an optimal solution (a minimum number of moves).

As technology for determining the shortest path between vertices in a graph as described above, there have been proposed a method for representing shortest paths between vertices in a graph as a shortest-path tree, a system for determining shortest path in a weighted graph, a system for determining shortest paths in an unweighted graph.

First, a description will be given of a method for representing shortest paths as a shortest-path tree. It has been known that the shortest paths from one vertex v to all vertices other than the vertex v may be represented as a shortest-path tree.

Herein, a graph including some of vertices and edges included in a graph is referred to as a "subgraph". A set of vertices in a subgraph is a subset of vertices in the original graph, and a set of edges in a subgraph is also a subset of a set of edges in the original graph. When there is a path from one of two arbitrary vertices in a subgraph to the other vertex therein, the subgraph is said to be connected. Also, a path whose start point and end point match each other is referred to as a "cycle".

In the above definitions, a tree may be said to be a connected subgraph that does not include a cycle. In general, the number of edges included in a tree is n−1, where n is the number of vertices included in the tree. A tree may also be depicted in a form like a tree that is turned upside down, in such a manner that one vertex is located at the top, vertices (group) connecting thereto are located therebelow, and vertices (group) connecting the vertices (group) are further located therebelow. In this case, the vertex at the top is called a root. A vertex that does not have any vertex therebelow is called a leaf. A vertex w that connects to right below one vertex v is called a child of the vertex v, and the vertex v is referred to as a parent of the vertex w. In addition, the largest distance from a leaf to the root of a tree is called the depth of the tree. In a tree, the path from a leaf to the root is uniquely determined.

A shortest-path tree representing the shortest paths from the vertex v to all vertices is referred to as a "shortest-path tree rooted at the vertex v" and is denoted by T(v). In other words, in the shortest-path tree T(v), with respect to an arbitrary vertex w included in T(v), the path from the vertex v to the vertex w in T(v) is the shortest path. It is also known that a path from the vertex v to the vertex w in T(v) becomes unique, because of properties of the tree.

In the shortest-path tree, the shortest path from the vertex v to the vertex w may be determined by sequentially recording, during traversal of the parent of the vertex w therefrom to the vertex v, the traversed vertex or vertices from the vertex w to the vertex v as a list and viewing the list in the opposite direction. The shortest-path tree does have no redundant vertices and is thus very effective as a method for representing a shortest path.

One known example of a system for determining a shortest path in a weighted graph is Dijkstra's algorithm for determining shortest paths from one vertex to all vertices, and the maximum amount of calculation (order) thereof is $O(|E|+|V|\log|V|)$. $|A|$ represents the number of elements included in a set A. That is, $|E|$ is the number of edges, and $|V|$ is the number of vertices. When calculation for the shortest path for each vertex by using Dijkstra's algorithm is applied to calculation for shortest paths from all vertices to all vertices, the maximum amount of calculation is $O(|V|(|E|+|V|\log|V|))$.

Another known system for determining a shortest path in a weighted graph is the Floyd-Warshall algorithm for determining shortest paths from each of all vertices to all the vertices, and the maximum amount of calculation thereof is $O(|V|^3)$.

Another known system for determining shortest paths in a weighted graph is the Bellman-Ford algorithm for determining shortest paths from one vertex to all vertices. When a graph is sparse (when the number of edges is relatively small compared with the number of vertices), the Bellman-Ford algorithm is said to be slower in calculating the shortest paths than Dijkstra's algorithm, but has an advantage in that it is possible to determine the paths even when the weight is negative. The maximum amount of calculation of the Bellman-Ford algorithm is $O(|E||V|)$. When the calculation for the shortest path for each vertex by using the Bellman-Ford algorithm is applied to calculation of the shortest paths from all vertices to all vertices, the maximum amount of calculation is $O(|E||V|^2)$.

As a system for determining a shortest path in an unweighted graph, there is a breadth-first search system for determining a shortest path by traversing an adjacent vertex list with breadth-first search. The adjacent vertex list is a list of vertices adjacent to one vertex. The number of edges that connect to a vertex v is referred to as a degree of the vertex v. That is, the number of vertices included in the adjacent vertex list is a degree. The maximum amount of calculation in the breadth-first search is $O(|E|+|V|)$. When the calculation for the shortest path for one vertex by using the breadth-first search system is applied to calculation of the shortest paths from all vertices to all vertices, the maximum amount of calculation is $O(|E||V|+|V|^2)$. A shortest-path tree may be naturally formed by applying the breadth-first search to an unweighted graph.

The above-described systems may be applied to both a directed graph and an undirected graph. There are two proposed systems that are applicable to calculation of shortest paths in an unweighted undirected graph, that is, a system for solving the shortest path problem of all vertices to all vertices without using a matrix and a system for solving the shortest path problem by using a matrix. The maximum amount of calculation in the system for solving the shortest path problem without using a matrix is as follows.

a) $O(|E||V|/\log|V|)$ for $|E|>|V|(\log|V|)^2$
b) $O(|E||V|\log \log|V|/\log|V|)$ for $|E|>|V|\log \log|V|$
c) $O(|V|2(\log \log|V|)2/\log|V|)$ for $|E|<=|V|\log \log|V|$ It is also reported that the maximum amount of calculation in the system for solving the shortest path problem by using a matrix is $O(|V|^{2.376})$.

Examples of related art include the following Non-Patent Documents:

"Spanning Tree—Wikipedia" Internet URL: http://ja.wikipedia.org/wiki/%E5%85%A8%E5%9F%9F%E6%9C%A8, searched online on Jul. 1, 2014;

"Dijkstra's Algorithm—Wikipedia", Internet URL: http://ja.wikipedia.org/wiki/%E3%83%80%E3%82%A4%E3%82%AF%E3%82%B9%E3%83%88%E3%83%A9%E6%B3%95, searched online on Jul. 1, 2014;

"Breadth-First Search - Wikipedia", Internet URL: http://ja.wikipedia.org/wiki/%E5%B9%85%E5%84%AA%E5%85%88%E6%8E%A2%E7%B4%A2, searched online on Jul. 1, 2014;

T. M. Chan, "All-Pairs Shortest Paths for Unweighted Undirected Graphs in o(mn) Time", SODA '06 Proceedings of the seventeenth annual ACM-SIAM symposium on Discrete algorithm, 2006;

R. Seidel, "On the all-pairs-shortest-path problem in unweighted undirected graphs", J. Comput. Sys. Sci., 51:400-403, 1995;

Z. Galil and O. Margalit, "All pairs shortest distances for graphs with small integer length edges", Inf. Comput., 134:103-139, 1997; and Z. Galil and O. Margalit, "All pairs shortest paths for graphs with small integer length edges", J. Comput. Sys. Sci., 54:243-254, 1997.

SUMMARY

According to an aspect of the invention, an apparatus generates, for each of vertices in a graph represented by the vertices and edges connecting the vertices, a first shortest-path tree rooted at a first root vertex that is equal to the each vertex in the graph, where the first shortest-path tree represents shortest paths from the first root vertex to vertices, a path between two vertices is a sequence of edges connecting a sequence of adjacent vertices through which the two vertices are connected to each other, a length of the path is a number of edges included in the path, a shortest path between the two vertices is a path whose length is smallest among all paths between the two vertices, and a distance between the two vertices is a length of the shortest path between the two vertices.

The generating a vertex in the first shortest path tree whose distance from the first root vertex is a natural number of N is performed based on searching for one or more child vertices of a vertex within a second shortest-path tree rooted at a second root vertex adjacent to the first root vertex whose distance from the first root vertex is N−1, and the vertex for searching is included in both the first shortest-path tree and the second shortest-path tree.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 21 is a diagram illustrating an example of vertex objects and t-vertex objects after initialization in a first embodiment;

FIG. 25 is a diagram illustrating an example of vertex objects and t-vertex objects at a stage when a shortest-path tree is generated up to depth 1 in a first embodiment;

FIG. 26 is a diagram illustrating an example of vertex objects and t-vertex objects at a stage when a shortest-path tree is generated up to depth 1 in a first embodiment;

FIG. 27 is a diagram illustrating an example of vertex objects and t-vertex objects at a stage when a shortest-path tree is generated up to depth 2 in a first embodiment;

FIG. 29 is a diagram illustrating an example of vertex objects and t-vertex objects at a stage when a shortest-path tree is generated up to depth 3 in a first embodiment;

FIG. 30 is a diagram illustrating an example of vertex objects and t-vertex objects at a stage when a shortest-path tree is generated up to depth 3 in a first embodiment;

FIG. 36 is a diagram illustrating an example of vertex objects and t-vertex objects after initialization in a second embodiment;

FIG. 40 is a diagram illustrating an example of vertex objects and t-vertex objects at a stage when a shortest-path tree is generated up to depth 1 in a second embodiment;

FIG. 41 is a diagram illustrating an example of an operational flowchart for generating a shortest-path tree rooted at vertex v up to depth 2 or more in a second embodiment;

FIG. 42 is a diagram illustrating an example of vertex objects and t-vertex objects at a stage when a shortest-path tree is generated up to depth 2 in a second embodiment;

FIG. 43 is a diagram illustrating an example of vertex objects and t-vertex objects at a stage when a shortest-path tree is generated up to depth 2 in a second embodiment;

FIG. 44 is a diagram illustrating an example of vertex objects and t-vertex objects at a stage when a shortest-path tree is generated up to depth 3 in a second embodiment; and FIG. 45 is a diagram illustrating an example of vertex objects and t-vertex objects at a stage when a shortest-path tree is generated up to depth 3 in a second embodiment.

DESCRIPTION OF EMBODIMENTS

Figure 1:
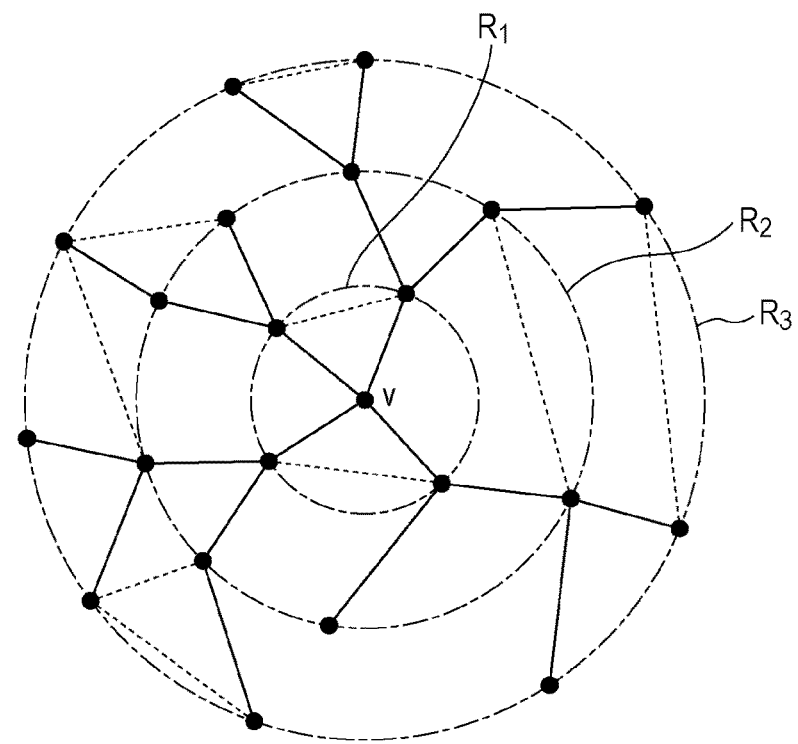
FIG. 1 is a diagram illustrating an example of a shortest-path tree rooted at a vertex and concentric circles corresponding to distances from the vertex, according to an embodiment.
Figure 2:
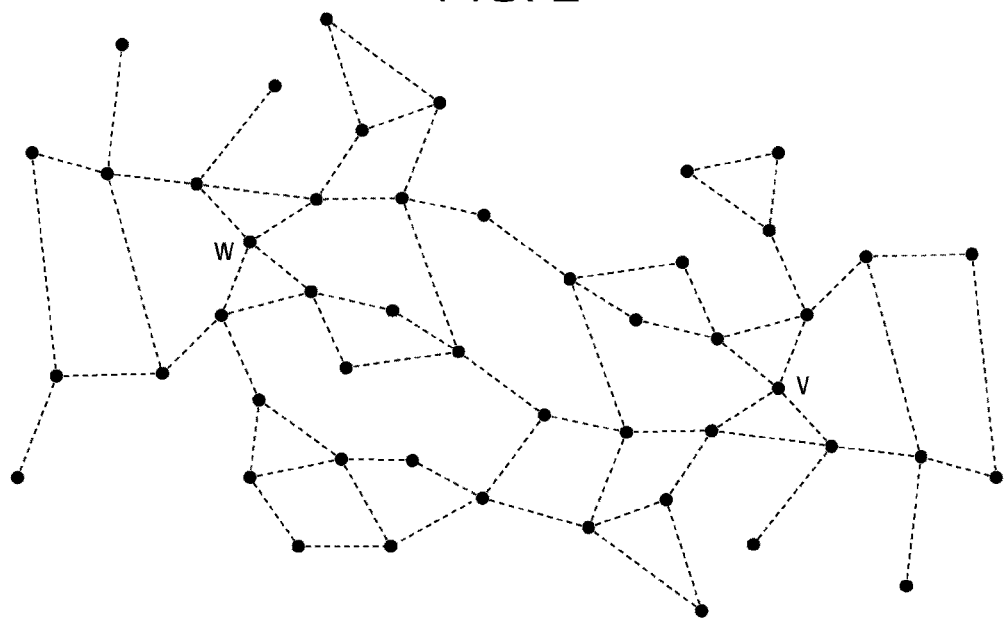
FIG. 2 is a diagram illustrating an example of shortest-path trees rooted at two vertices for depth 0, according to an embodiment.
Figure 3:
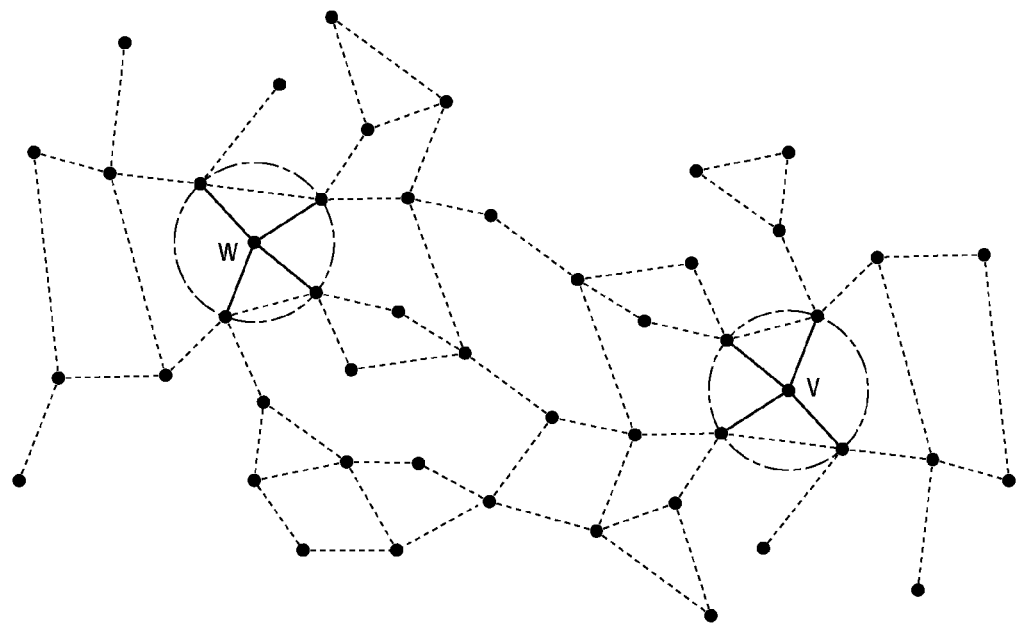
FIG. 3 is a diagram illustrating an example of shortest-path trees rooted at two vertices and rings for depth 1, according to an embodiment.
Figure 4:
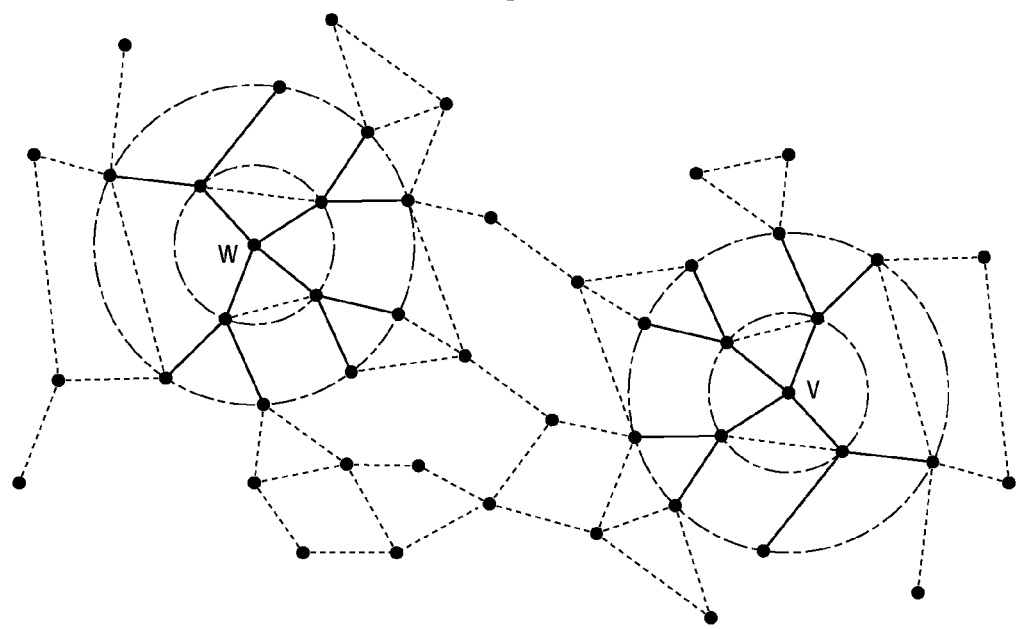
FIG. 4 is a diagram illustrating an example of shortest-path trees rooted at two vertices and rings for depth 2, according to an embodiment.
Figure 5:
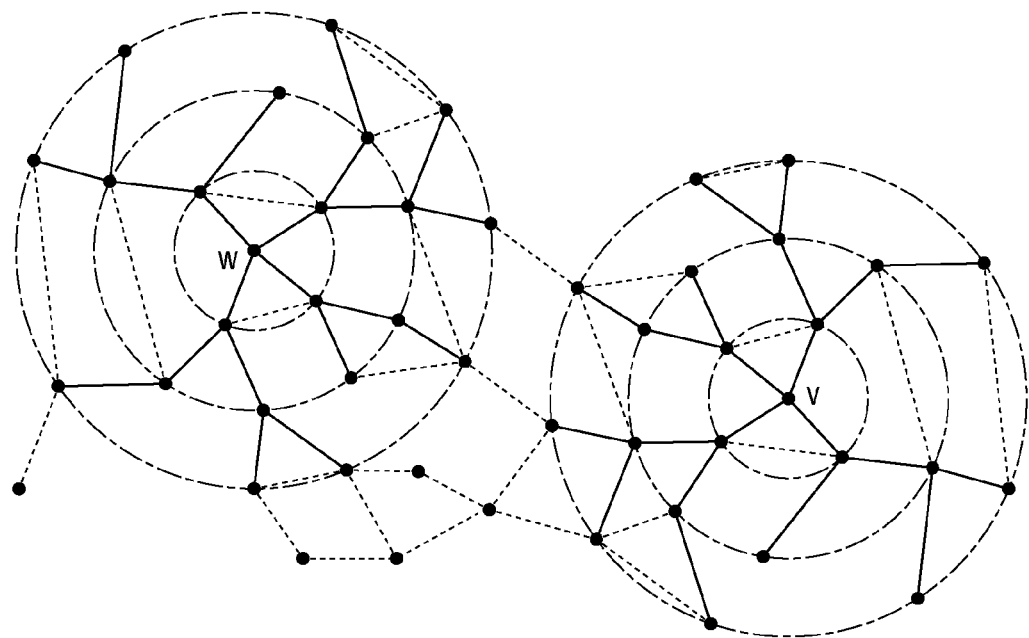
FIG. 5 is a diagram illustrating an example of shortest-path trees rooted at two vertices and rings for depth 3, according to an embodiment.

In the related art, a shortest-path tree rooted at a certain vertex is generated as a shortest-path tree representing a shortest path between vertices. After aggregating information about adjacent vertices of other vertices, the shortest-path tree is generated while selecting a shortest path. If this processing is performed on all vertices, the amount of calculation increases. Also, in other related art for calculating a shortest path, the amount of calculation increases when all the shortest paths from all vertices to all vertices are calculated, as described above.

Embodiments according to the present disclosure will be described below by way of example with reference to the accompanying drawings. In each embodiment described below, with respect to each of vertices included in a graph including the vertices and edges connecting the vertices, a shortest-path tree that represents shortest paths to the other vertices is generated.

In particular, an object of the embodiments is to determine a shortest path from each vertex in an unweighted graph to each of all vertices that exist within distance d. Since cases in which some applications do not use the shortest path from each vertex to each of all vertices included in a graph are also envisaged, the shortest-path determination is performed on the vertices that exist within distance d in order to determine a shortest path within a range corresponding to each application. For example, in an example of a graph representing network-based data of a human relationship, for an application that determines a shortest path for accessing a person who does not have a direct relationship, there are cases in which it is sufficient to be able to set a person who is present up to distance 3 from a subject person as an intended person. In such a case, setting d=3 makes it possible to omit the calculation of shortest paths to farther vertices.

As described below, setting a large value for the distance d also covers a case in which a shortest path from each of all vertices included in the graph to each of all other vertices. The problem for determining shortest paths in an unweighted graph is also thought to be a shortest path problem in a weighted graph in which weights assigned to edges are all "1". That is, the shortest paths determined in the embodiments are also regarded as a special case of a shortest path problem in a weighted graph.

A system based on each embodiment and a first embodiment will be described below based on the premise that the graph to be processed is an undirected graph. Particulars unique to a directed graph will be described in detail in conjunction with a second embodiment described below.

<Concentric Breadth-First Search System>

First, before details of particular embodiments are described, a combined system of breadth-first search, path management using a shortest-path tree, and vertex management using a concentric circle will be described as a system that serves as a base of the embodiments described below. Herein, this system is referred to as a "concentric breadth-first search system". The description below will be given of a case of a connected undirected graph, as illustrated in graphs used for description. It is, however, easy to convert this system into a system for a directed graph by converting an adjacent vertex list into a list of vertices connecting to edges that go out of the vertex of interest and making a modification described in the second embodiment described below.

The "breadth-first search" is a scheme for determining a shortest path in an unweighted graph and is a system for determining a shortest path by traversing an adjacent vertex list with breadth-first search. The "path management using a shortest-path tree" means managing, for each vertex, information about a shortest-path tree naturally generated by breadth-first search. The "vertex management using a concentric circle" means managing, for each vertex, a position at distance k from the vertex by using a concentric circle for each distance k and managing a set of vertices that exists on the concentric circle by using list[k] associated with the distance k. In the present embodiment, since an unweighted graph is processed, the distances between adjacent vertices are assumed to be all "1". Accordingly, list[k] indicates a set of vertices on the kth concentric circle from a vertex that serves as a root. List[0] is constituted by only a vertex that serves as a root.

FIG. 1 is a diagram depicted by overlaying a shortest-path tree rooted at a vertex v and concentric circles that are centered at the vertex v and correspond to the distances between the vertex v and other vertices. In FIG. 1, the vertices are represented by black dots, the edges of the shortest-path tree are represented by solid lines, the edges included in the edges in the original graph and not included in the shortest-path tree are represented by dashed lines, and the concentric circles are represented by dashed-and-dotted lines. The methods for depicting the vertices, the edges in the shortest-path tree, the edges in the original graph, and the concentric circles also apply to the other drawings, unless otherwise particularly stated.

An overview of generation of a shortest-path tree by using the concentric breadth-first search system is as follows.

1) A shortest-path tree T(v) rooted at each vertex v for depth 0 includes only the vertex v 2) A shortest-path tree T(v) rooted at each vertex v is generated while extending T(v) concentrically (in a breadth-first manner)

3) With respect to each vertex v, a next vertex to be included in the shortest-path tree T(v) is searched for from all vertices adjacent to the leaves of the shortest-path tree T(v).

The concentric extension (2) described above is realized by sequentially repeating the processing (3) for depth k=1, 2, . . . , d. When each of shortest-path trees rooted at all vertices includes all vertices is found to include all the vertices included in a graph even in the middle of the processing (3), the above-described processing is finished since the further processing may be omitted.

Hereinafter, positions at distance k from a vertex v are denoted by a concentric circle $R_k$, as illustrated in FIG. 1, and each set of vertices that exists concentrically is referred to as a "ring". In the concentric breadth-first search system, since a shortest-path tree is generated while concentrically extending it centered at a vertex that serves as the root of the shortest-path tree, rings $R_1$, $R_2$, and $R_3$ are set in this order.

FIGS. 2 to 5 schematically illustrate shortest-path trees of two vertices v and w for depth 0 to depth 3 and rings set according to the depths. Although FIGS. 2 to 5 illustrate only two vertices v and w, shortest-path trees are similarly generated for the other vertices. Thus, the shortest-path trees are sequentially generated in the order depth 0, depth 1, depth 2, depth 3, . . . .

Next, a description will be given of a data structure of data managed in the concentric breadth-first search system. In the concentric breadth-first search system, vertex objects that are data structures representing vertices and t-vertex objects that are data structures representing vertices constituting shortest-path trees are managed. Hereinafter, vertices indicated by vertex objects are referred to as "vertices", and vertices indicated by t-vertex objects are referred to as "t-vertices".

The vertex objects have the following attributes.
  id: a vertex identifier for identifying a vertex v. For example, a unique integer that is 1 or more and that is |V| or less.
  adj_vertices: a list of vertices adjacent to a vertex v (an adjacent vertex list)
  sptree_depth: the depth of a shortest-path tree at the current stage and also the distance to the farthest vertex from the vertex v in the shortest-path tree
  sptree: the root of the shortest-path tree rooted at the vertex v. A t-vertex object corresponding to the vertex v is registered.
  sptree_closure: a hash table whose key is the vertex identifier of each vertex included in the shortest-path tree rooted at the vertex v. A t-vertex object corresponding to a vertex identified with the vertex identifier indicated by the key is registered as a hash table value corresponding to the key.
  ring[k]: a list including an array of t-vertex objects corresponding to the vertices included in a set of vertices (that is, the above-described "ring") at distance k from the vertex v.

In this case, sptree_closure is used in order to determine whether or not a vertex whose vertex identifier is id exists in the shortest-path tree. Also, sptree_closure is used for determining a vertex corresponding to the vertex identifier id and for determining a shortest path from the vertex v to the vertex corresponding to the vertex identifier id. In this case, the shortest path from the vertex v to the vertex corresponding to the vertex identifier id is determined by traversing an attribute "parent" of a t-vertex object (described below) to determine a path from the vertex corresponding to the vertex identifier id to the vertex v and then traversing the path from the vertex v in the opposite direction.

As described above, the t-vertex objects are data structures (objects) representing t-vertices constituting a shortest-path tree. Also, "t-" means a tree. Connections between the vertices in the shortest-path tree T(v) rooted at the vertex v differ each time a vertex that serves as the root varies, and are thus managed as t-vertex objects independently from the vertex objects. Attributes to be managed for the vertices in a shortest-path tree may be some of all attributes of the vertex objects, and are thus managed as t-vertex objects independently from the vertex objects.

Also, each t-vertex object has the following attributes.
  vertex: a vertex object corresponding to a t-vertex object
  children: a list of t-vertex objects representing child t-vertices in a shortest-path tree. This list is empty when there is no child.
  parent: a t-vertex object representing a parent t-vertex in the shortest-path tree The vertex objects and the t-vertex objects will be described below in more detail through use of a graph illustrated in FIG. 6.

Figure 6:
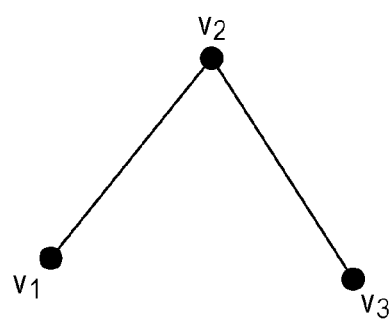
FIG. 6 is a diagram illustrating an example of a graph, according to an embodiment.
Figure 7:
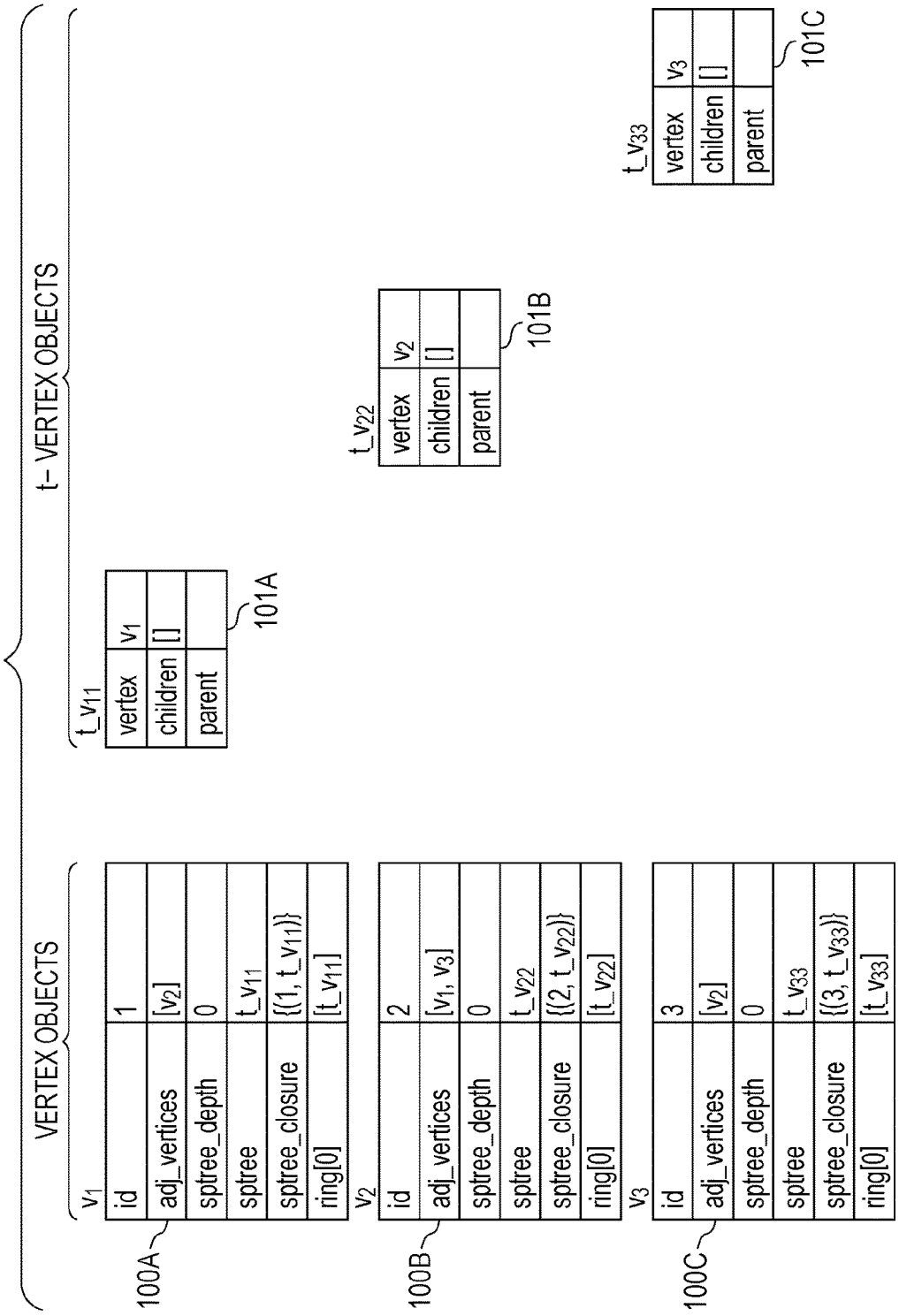
FIG. 7 is a diagram illustrating an example of vertex objects and t-vertex objects after initialization in a concentric breadth-first search system, according to an embodiment.

FIG. 7 illustrates a data structure created as a result of initialization (described below in detail) based on the graph illustrated in FIG. 6. The state illustrated in FIG. 7 is a state in which shortest-path trees have been determined up to depth 0. In FIG. 7, 100A is a vertex object of the vertex $v_1$, 100B is a vertex object of the vertex $v_2$, and 100C is a vertex object of the vertex $v_3$. Also, 101A is a t-vertex object of $t\_v_{11}$, 101B is a t-vertex object of $t\_v_{22}$, and 101C is a t-vertex object of $t\_v_{33}$. When the individual vertex objects 100A to 100C in the concentric breadth-first search system are described without distinction therebetween, they are simply referred to as "vertex objects 100", and the individual t-vertex objects 101A to 101C are described without distinction therebetween, they are simply referred to as "t-vertex objects 101".

Now, a description will be given of notations in the drawings and descriptions for the vertex objects 100 and the t-vertex objects 101. Blank fields in the drawings mean that there are no corresponding values for the attributes, and are indicated as "nil" in the description below. That is, in order to clarify the drawings, the blank fields are illustrated in the drawings to mean that nil is set. Also, $[x_1, x_2, x_3]$ represents a list in which elements $x_1$, $x_2$, and $x_3$ are arrayed in this order, $[x_1]$ represents a list constituted by a single element $x_1$, and [ ] represents an empty list. Also, $\{(x_1, y_1), (x_2, y_2), (x_3, y_3)\}$ represents a hash table (associative memory) constituted by three pairs, and each pair $(x_i, y_i)$ indicates that a value corresponding to a key $x_i$ is $y_i$. It is assumed that use of the hash table makes it possible to access $y_i$ in a certain time-period by using the key $x_i$ so as to retrieve $y_i$, regardless of the number of pairs included in the hash table. $\{(x_1, y_1)\}$ represents a hash table constituted by one pair $(x_1, y_1)$.

Also, $t\_v_{ij}$ represents, of t-vertices included in a shortest-path tree rooted at a vertex $v_i$, a t-vertex corresponding to a vertex $v_j$. For example, $t\_v_{22}$ represents a t-vertex that is included in a shortest-path tree rooted at a vertex $v_2$ and that corresponds to the vertex $v_2$, that is, represents $v_2$ itself. Thus, the attribute "sptree" in the vertex object 100B of the vertex $v_2$ indicates $t\_v_{22}$, and this indicates that the root of the shortest-path tree rooted at the vertex $v_2$ is represented by $t\_v_{22}$ as a t-vertex object, that is, the root is the vertex $v_2$ itself. The reason why the field of the attribute "parent" in the t-vertex object 101B of $t\_v_{22}$ is blank is that the root of the shortest-path tree is the vertex $v_2$ and thus there is no parent for the root of the shortest-path tree.

Figure 8:
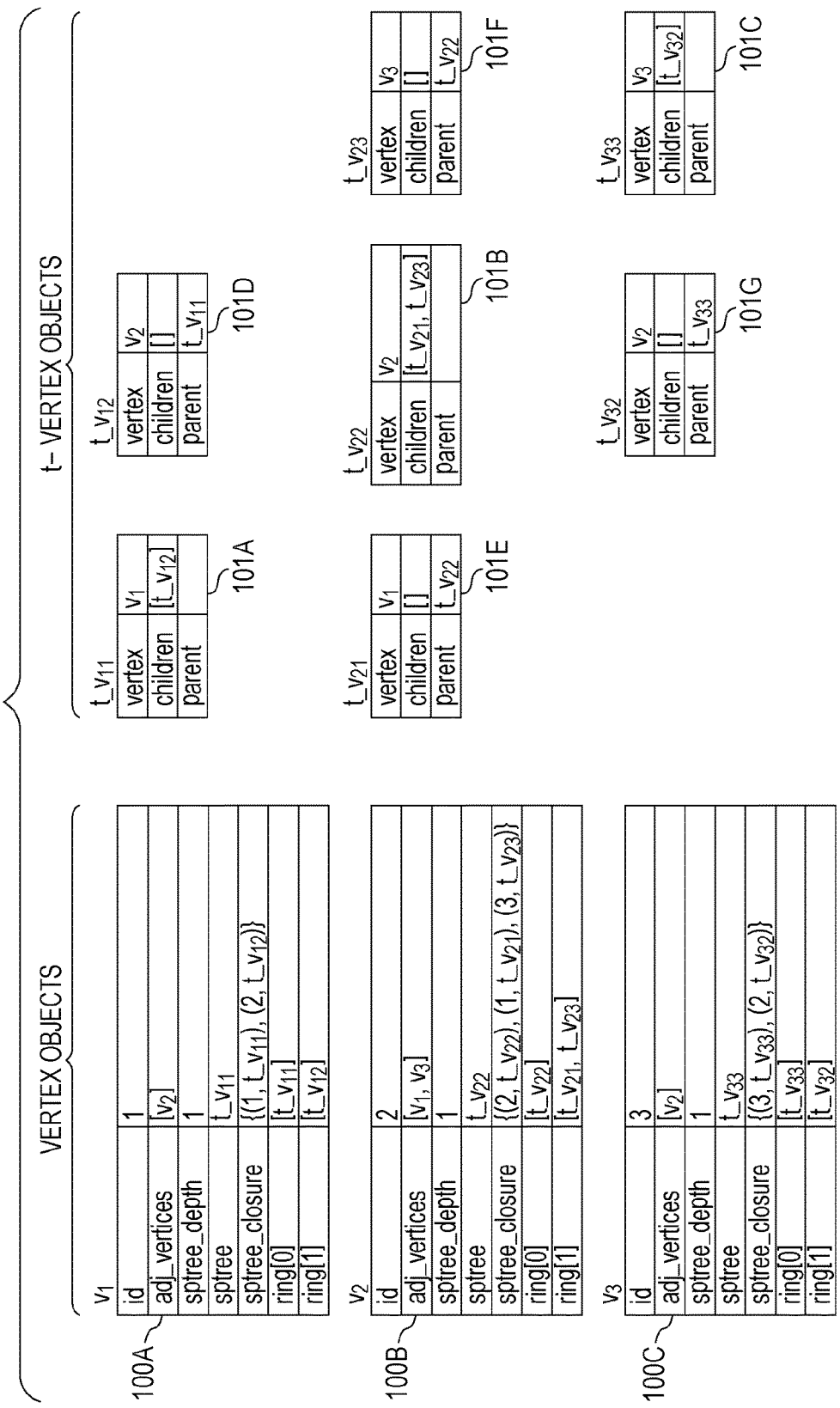
FIG. 8 is a diagram illustrating an example of vertex objects and t-vertex objects at a stage when shortest-path trees are generated up to depth 1 in a concentric breadth-first search system, according to an embodiment.

FIG. 8 illustrates vertex objects 100 and t-vertex objects 101 at a stage when the shortest-path trees for the graph in FIG. 6 are generated up to depth 1. 101D is a t-vertex object of $t\_v_{12}$, 101E is a t-vertex object of $t\_v_{21}$, 101F is a t-vertex object of $t\_v_{23}$, and 101G is a t-vertex object of $t\_v_{32}$. As illustrated in FIG. 8, the three t-vertex objects 101E, 101G, and 101F representing the t-vertices are generated for the shortest-path tree rooted at the vertex $v_2$. That is, at the stage of depth 1, the shortest-path tree rooted at the vertex $v_2$ includes all of the vertices in the graph illustrated in FIG. 6, so that the generation of the shortest-path tree is completed. On the other hand, at the stage of depth 1, the shortest-path trees rooted at the vertex $v_1$ and $v_3$ do not include all of the vertices in the graph illustrated in FIG. 6, so that the generation of the shortest-path trees is not yet completed. In such a manner, the depth of each shortest-path tree differs depending on a vertex that serves as the root.

Figure 9:
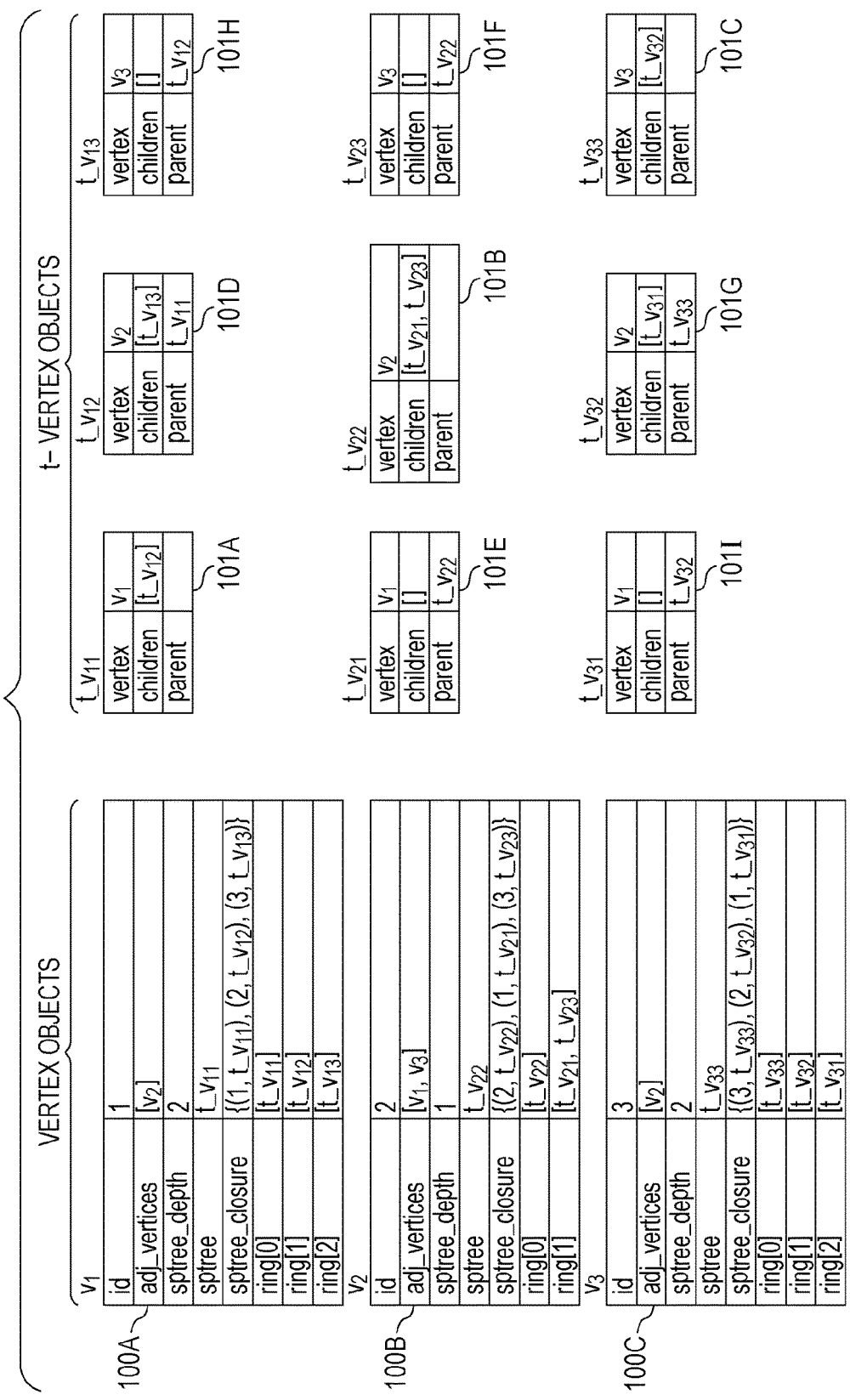
FIG. 9 is a diagram illustrating an example of vertex objects and t-vertex objects at a stage when shortest-path trees are generated up to depth 2 in a concentric breadth-first search system, according to an embodiment.

FIG. 9 illustrates vertex objects 100 and t-vertex objects 101 at a stage when the shortest-path trees for the graph in FIG. 6 are generated up to depth 2. 101H is a t-vertex object of a vertex $t\_v_{13}$, and 101I is a t-vertex object of a vertex $t\_v_{31}$. As illustrated in FIG. 9, at the stage of depth 2, the generation of the shortest-path tree rooted at each vertex is completed for all of the vertices 100A to 100C included in the graph illustrated in FIG. 6.

Figure 10:
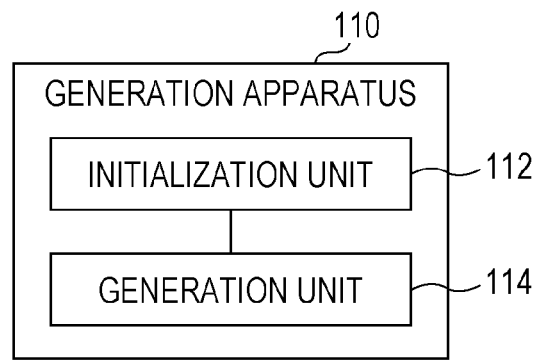
FIG. 10 illustrates an example of functional block diagram of a generation apparatus for executing shortest-path tree generation in a concentric breadth-first search system, according to an embodiment.

The shortest-path trees generation using the concentric breadth-first search system may be executed by, for example, a generation apparatus 110 illustrated in FIG. 10. The generation apparatus 110 includes an initialization unit 112 and a generation unit 114, as illustrated in FIG. 10. Based on information of vertices and edges included in a graph, the initialization unit 112 initializes vertex objects 100 of the respective vertices and also generates t-vertex objects 101 of t-vertices representing shortest-path trees up to depth 0. The generation unit 114 sequentially extends the shortest-path trees in the order of depth 1, depth 2, . . . to generate or update the vertex objects 100 and the t-vertex objects 101.

Figure 11:
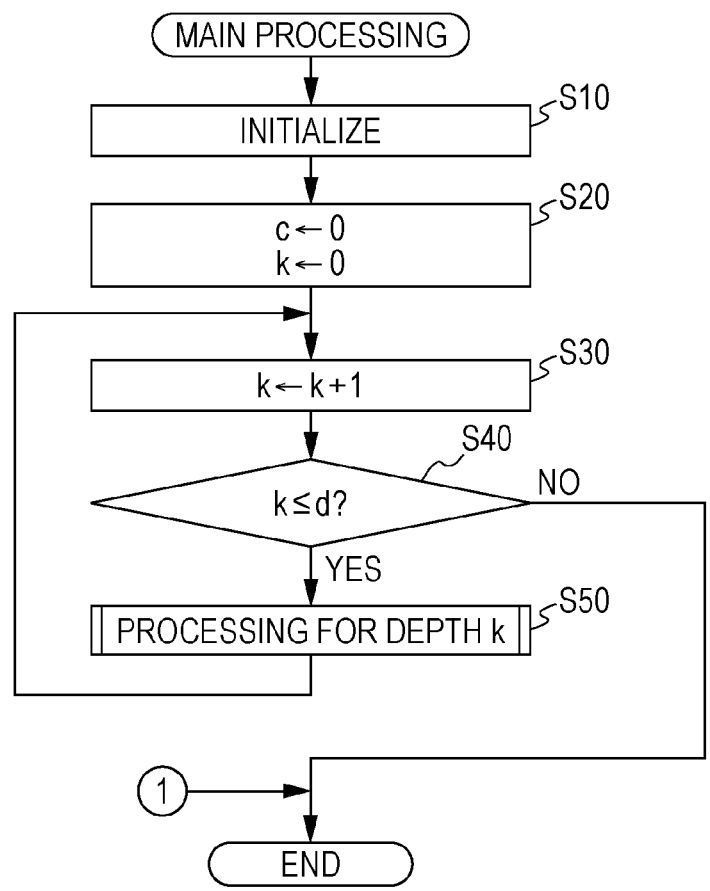
FIG. 11 is a diagram illustrating an example of an operational flowchart for main processing in shortest-path tree generation processing in a concentric breadth-first search system, according to an embodiment.
Figure 12:
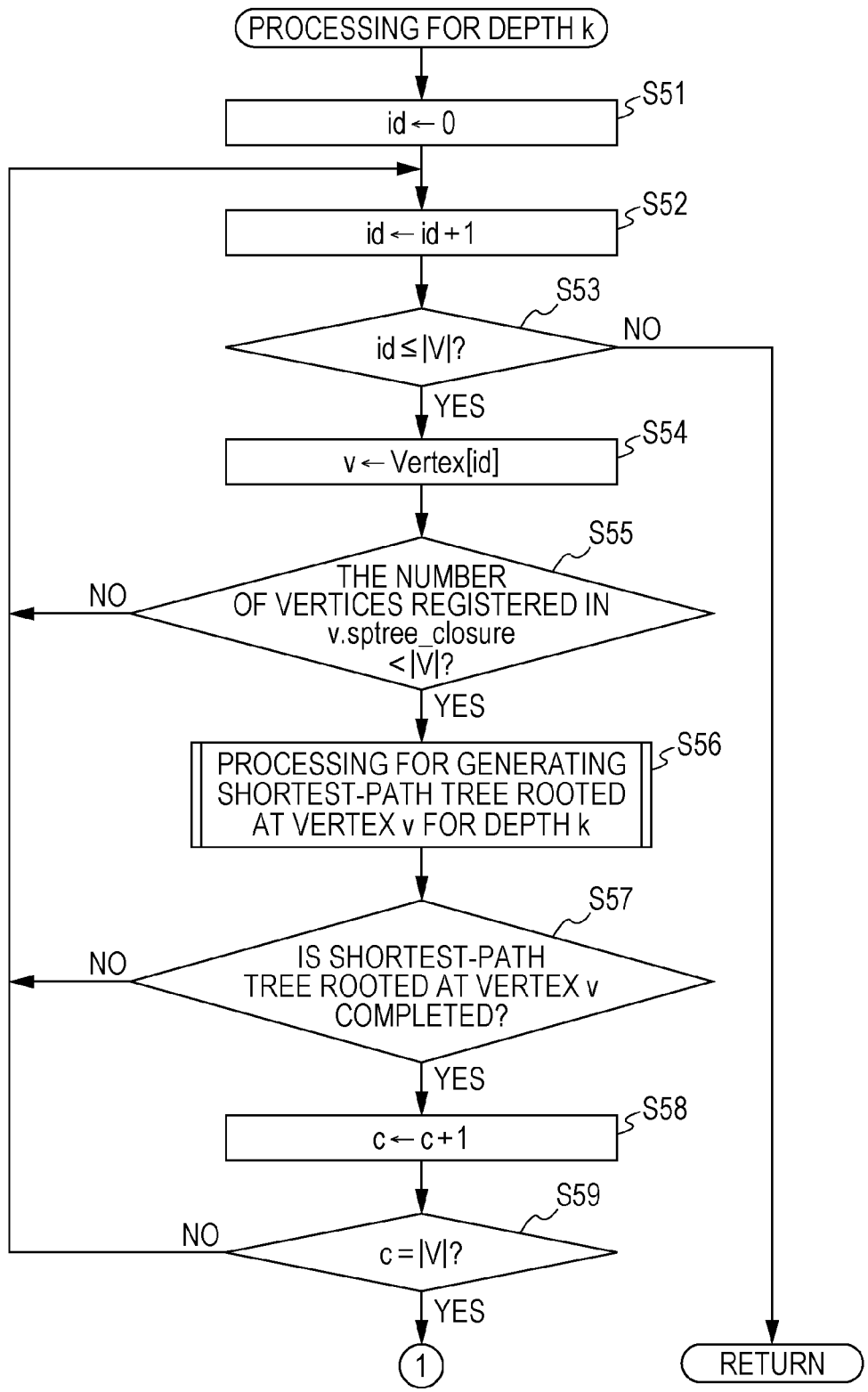
FIG. 12 is a diagram illustrating an example of an operational flowchart for processing for depth k in a concentric breadth-first search system, according to an embodiment.
Figure 13:
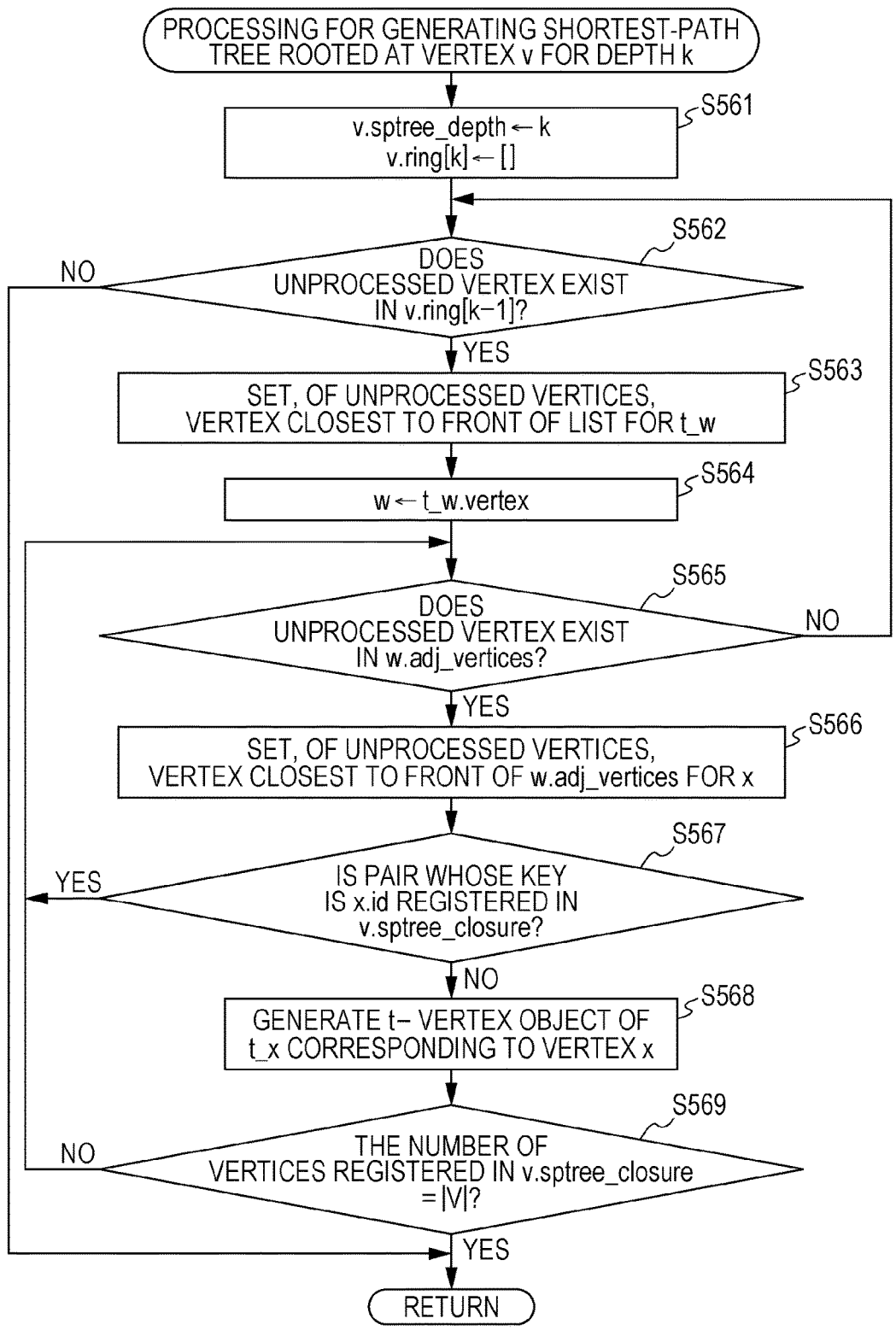
FIG. 13 is a diagram illustrating an example of an operational flowchart for generating a shortest-path tree rooted at a vertex for depth k in a concentric breadth-first search system, according to an embodiment.

Next, an operational flowchart of the shortest-path tree generation processing using the concentric breadth-first search system will be described with reference to FIGS. 11 to 13. FIG. 11 is a diagram illustrating an example of an operational flowchart for main processing, FIG. 12 is a diagram illustrating an example of an operational flowchart for depth k, and FIG. 13 is a diagram illustrating an example of an operational flowchart for generating a shortest-path tree rooted at a vertex v for depth k. Data structure changes according to the shortest-path tree generation processing will be described with reference to the vertex objects 100 and the t-vertex objects 101 for each depth which are illustrated in FIGS. 7 to 9. Hereinafter, an attribute X of the vertex object 100 of the vertex v is referred to as "v.X", and an attribute X of the t-vertex object 101 of $t\_v$ is referred to as "$t\_v.X$".

In step S10 in the main processing in the shortest-path tree generation processing using the concentric breadth-first search system illustrated in FIG. 11, the initialization unit 112 receives data of a graph G represented by G=(V, E). The following description will be given of a case in which the graph G is the graph illustrated in FIG. 6, that is, a case of $V=[v_1, v_2, v_3]$ and $E=[v_1v_2, v_{2\_3}]$. In this case, i of vertex data $v_i$ is a vertex identifier for identifying each vertex and is assumed to be a unique value of 1 to |V|. In this case, let i=1, 2, 3. The edge data E is represented by connecting the vertices at both ends of each edge. In the following description, the vertices included in the graph G are managed by an array Vertex[ ] in which the vertex identifier is an index.

The initialization unit 112 initializes the vertex objects 100 of the respective vertices, based on the received data of the graph G. More specifically, the initialization unit 112 registers the vertex identifier of the vertex v in v.id. The initialization unit 112 extracts the vertex at one end of each edge having the vertex v at its other end and registers the extracted vertex in v.adj_vertices as an adjacent vertex list of the vertex v. The initialization unit 112 also registers "0" in v.sptree_depth as the depth at the current stage of the shortest-path tree. The initialization unit 112 then generates a t-vertex object 101 corresponding to the vertex v, registers v in $t\_v$.vertex, sets [ ] for $t\_v$.children, and sets nil for $t\_v$.parent. The initialization unit 112 also registers the generated t-vertex object $t\_v$ in v.sptree. The initialization unit 112 also registers, in v.sptree_closure, a hash table including a pair (v.id, $t\_v$) in which the key is v.id and the value is $t\_v$. The initialization unit 112 registers a list including $t\_v$ in v.ring[0].

As a result of this initialization processing, the vertex objects 100A, 100B, and 100C and the t-vertex object 101A, 101B, and 101C illustrated in FIG. 7 are generated.

Next, in step S20, the generation unit 114 sets 0 for each of a variable c and a variable k. The variable c is a variable for counting the number of shortest-path trees in which the number of vertices included therein becomes equal to |V|, that is, the number of shortest-path trees that include all vertices included in the graph G and that are not further extendable. The variable k indicates a depth of a shortest-path tree. In step S30, the generation unit 114 increments the variable k by 1. Next, in step S40, the generation unit 114 determines whether or not the variable k is smaller than or equal to a value d that is pre-set as a depth for generating shortest-path trees. When the variable k is smaller than or equal to d, the process proceeds to step S50.

When it is desired to determine shortest paths from all vertices to all vertices, it is sufficient to let d=|V|−1. This is because the distance to a vertex at a position farthest from one vertex is at most d=|V|−1. That is, the distance from a vertex v to a vertex that is included in a graph in which the remaining |V|−1 vertices are linearly arranged and that is the farthest from the vertex v is |V|−1. Even if the depth is set to d=|V|−1, the generation of shortest-path trees is finished before the variable k reaches |V|−1, because of a function (described below) of the variable c, except for a graph in which all vertices are linearly connected.

In step S50, the generation unit 114 executes processing for depth k which is illustrated in FIG. 12.

In step S51 in FIG. 12, the generation unit 114 sets 0 for a variable "id" corresponding to v.id. In step S52, the generation unit 114 increments id by 1. Next, in step S53, the generation unit 114 determines whether or not the variable "id" is smaller than or equal to the number of vertices |V| included in the graph G, to thereby determine whether or not the processing for depth k has been finished on all vertices. When the variable "id" is smaller than or equal to |V|, the process proceeds to step S54.

In step S54, the generation unit 114 extracts, from the vertex array Vertex[ ], a vertex Vertex[id] whose vertex identifier is id, and sets the extracted vertex Vertex[id] for a vertex v to be processed.

Next, in step S55, the generation unit 114 determines whether or not the number of vertices registered in v.sptree_closure is smaller than |V|, to thereby determine whether or not the generation of a shortest-path tree rooted at the vertex v is completed. When the number of vertices registered in v.sptree_closure is smaller than |V|, it is determined that the generation of the shortest-path tree rooted at the vertex v is not completed, and the process proceeds to step S56. When the number of vertices registered in v.sptree_closure reaches |V|, it is determined that the generation of the shortest-path tree rooted at the vertex v is completed, and the process returns to step S52.

In step S56, the generation unit 114 executes processing for generating the shortest-path tree rooted at the vertex v for depth k, the processing being illustrated in FIG. 13.

In step S561 in FIG. 13, the generation unit 114 sets k for v.sptree_depth, adds v.ring[k] as an attribute, and sets an empty list [ ] for v.ring[k]. Next, in step S562, the generation unit 114 determines whether or not a vertex on which subsequent processes have not been performed exists in v.ring[k−1]. When an unprocessed vertex exists, the process proceeds to step S563, and when no unprocessed vertex exists, the process returns to the processing for depth k which is illustrated in FIG. 12.

In step S563, the generation unit 114 extracts, of unprocessed vertices that exist in v.ring[k−1], the vertex closest to the front of v.ring[k−1] and sets the extracted vertex for t_w. Next, in step S564, the generation unit 114 extracts the vertex object registered in t_w.vertex and sets the extracted vertex object for a vertex w. For example, for k=1 and id=1, t_$v_{11}$ is extracted from $v_1$sing[0]. Then, the vertex object $v_1$ registered in t_$v_{11}$.vertex is extracted, and the vertex $v_1$ is set for the vertex w.

Next, in step S565, the generation unit 114 determines whether or not a vertex on which subsequent processes have not been performed exists in w.adj_vertices. When an unprocessed vertex exists, the process proceeds to step S566, and when no unprocessed vertex exists, the process returns to step S562.

In step S566, the generation unit 114 extracts, of unprocessed vertices that exist in w.adj_vertices, the vertex closest to the front of w.adj_vertices and sets the extracted vertex for the vertex x. For example, in the example of k=1 and id=1, the vertex $v_2$ registered in $v_i$.adj_vertices of the vertex object 100A of the vertex $v_1$ that is the vertex w is set for the vertex x.

Next, in step S567, the generation unit 114 determines whether or not a pair whose key is the vertex identifier of the vertex x, that is, is the vertex identifier registered in x.id, is registered in the hash table registered in v.sptree_closure. When it is determined in step S567 that the pair is not registered, the process proceeds to step S568, and when the pair is registered, it is determined that the vertex x is already included in the shortest-path tree rooted at the vertex v for depth k, and then the process returns to step S565.

In step S568, the generation unit 114 generates a t-vertex object 101 of t_x corresponding to the vertex x. The generation unit 114 then registers x in Lx.vertex, sets an empty list [ ] for t_x.children, and registers t_w in t_x.parent. The generation unit 114 also adds t_x to the tail of the list registered in t_w.children. The generation unit 114 also adds a pair in which the key is x.id and the value is t_x to the hash table registered in v.sptree_closure and adds t_x to the tail of the list registered in v.ring[k].

For example, in the example of k=1 and id=1, the t-vertex object 101D of t_$v_{12}$ corresponding to the vertex $v_2$ extracted as the vertex x is generated, $v_2$ is registered in t_$v_{12}$.vertex, and t_$v_{11}$ is registered in t_$v_{12}$.parent. Also, t_$v_{12}$ is added to the tail of the list registered in t_$v_{ii}$.children. A pair (2, t_$v_{12}$) is then added to the hash table registered in $v_i$.sptree_closure, and t_$v_{12}$ is added to the tail of the list registered in $v_1$ring[1]. As a result, as illustrated in FIG. 8, the t-vertex object 101D is generated, the vertex object 100A is updated, and the t-vertex object 101A is updated.

Next, in step S569, the generation unit 114 determines whether or not the number of pairs included in the hash table registered in v.sptree_closure, that is, the number of vertices included in the shortest-path tree T(v), has reached |V|. By doing so, the generation unit 114 determines whether or not the generation of the shortest-path tree T(v) rooted at the vertex v is completed. When the number of vertices registered in v.sptree_closure is smaller than |V|, it is determined that the generation of the shortest-path tree rooted at the vertex v is not completed, and the process returns to step S565. When the number of vertices registered in v.sptree_closure has reached |V|, it is determined that the generation of the shortest-path tree rooted at the vertex v is completed, and the process returns to the processing for depth k which is illustrated in FIG. 12.

Next, in step S57 in FIG. 12, a determination is made as to whether or not the shortest-path tree rooted at the vertex v is completed in step S56, that is, the vertex registered in v.sptree_closure is equal to |V|. When the result of the determination in step S569 illustrated in FIG. 13 is affirmative, and the process proceeds to step S57, the generation unit 114 determines that the shortest-path tree rooted at the vertex v is completed, and the process proceeds to step S58. When the result of the determination in step S562 illustrated in FIG. 13 is negative, and the process proceeds to step S57, the generation unit 114 determines that the shortest-path tree rooted at the vertex v is not completed, and the process returns to step S52.

In step S58, the generation unit 114 increments the variable c by 1, and next, in step S59, the generation unit 114 determines whether or not the variable c has reached |V|. There are also cases in which, even in the middle of the loop of the shortest-path tree generation processing, the generation of the shortest-path trees rooted at all vertices included in the graph is completed. Accordingly, when the result of the determination in step S59 is affirmative, the further processing may be omitted, and thus, the process returns to the main processing, and the entire shortest-path tree generation processing is finished. When the result of the determination in step S59 is negative, the process returns to step S52.

The processes in steps S52 to S59 are repeated, and when the result of the determination in step S53 is negative, the processing for depth k is finished, and the process returns to step S30 in the main processing illustrated in FIG. 11. The processes in steps S30 to S50 are repeated, and when it is determined that the variable k exceeds d in step S40, it is determined that the generation of the shortest-path trees up to the intended depth is finished, and the main processing is finished.

FIG. 8 illustrates vertex objects 100 and t-vertex objects 101 at a stage when the processing for depth k=1 is finished. FIG. 9 illustrates vertex objects 100 and t-vertex objects 101 at a stage when the processing for depth k 32 2 is finished.

Figure 14:
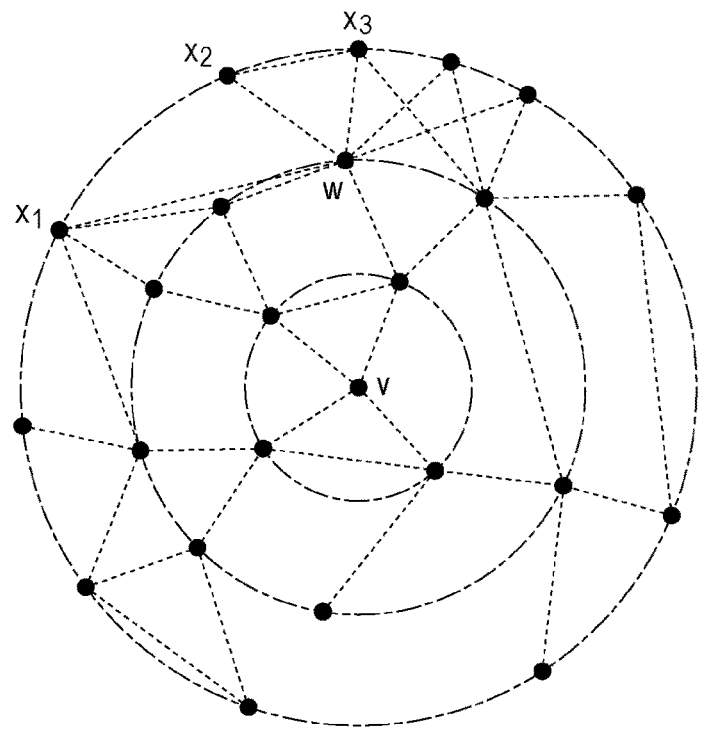
FIG. 14 is a diagram illustrating an example of vertices, according to an embodiment.
Figure 15:
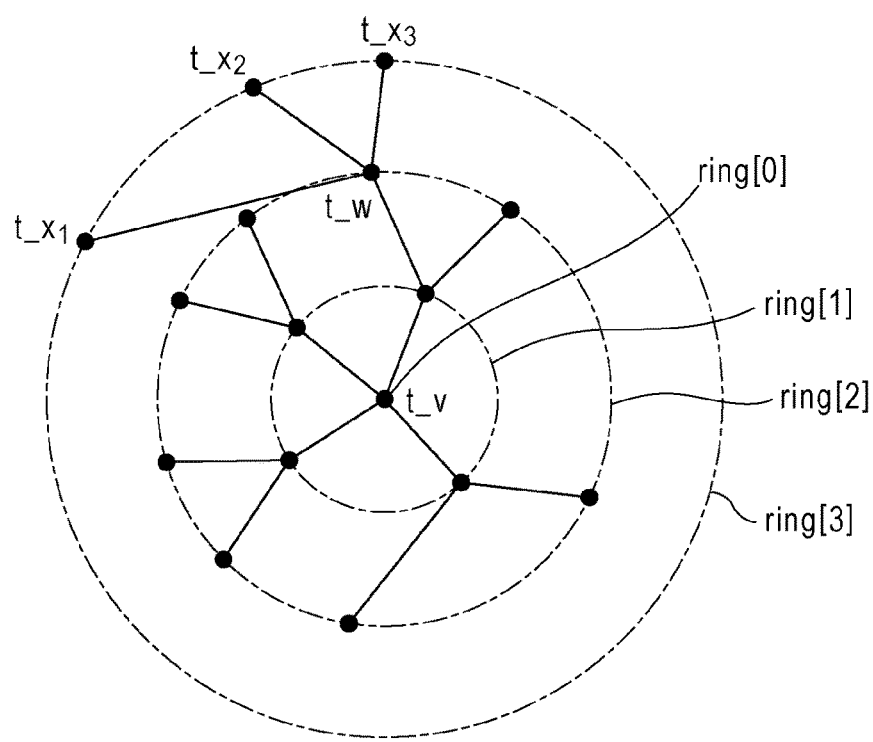
FIG. 15 is a diagram illustrating an example of a stage in the middle of generation of a shortest-path tree for depth 3, according to an embodiment.

More complex graphs illustrated in FIGS. 14 and 15 are used to indicate the relationships between vertices and t-vertices. FIG. 14 is a graph represented by vertices indicated by vertex objects, and FIG. 15 is a graph illustrating a shortest-path tree rooted at a vertex v and represented by t-vertices indicated by t-vertex objects. Vertices v, w, $x_1$, $x_2$, and $x_3$ correspond to t-vertices t_v, t_w, t_$x_1$, t_$x_2$, and t_$x_3$, respectively. FIG. 15 illustrates a stage in the middle of generation of the shortest-path tree T(v) for depth k=3. More specifically, FIG. 15 illustrates a state in which t_w is first extracted in step S563 in the processing (see FIG. 13) for generating a shortest-path tree rooted at the vertex v for depth 3, and, in steps S566 to S568, vertices $x_1$, $x_2$, and $x_3$ adjacent to the vertex w are checked in this order and t-vertex objects indicating t_$x_1$, t_$x_2$, and t_$x_3$ corresponding to the respective vertices $x_1$, $x_2$, and $x_3$ are generated. At this point in time, the t-vertices included in the list registered in v.ring[3] are t_$x_1$, t_$x_2$, and t_$x_3$.

<Overview of Embodiments>

In the above-described concentric breadth-first search system, during extension of a shortest-path tree, all vertices adjacent to vertices corresponding to leaves in an already generated shortest-path tree are searched for to check whether or not each of all the vertices is to be included in the shortest-path tree rooted at the vertex v. Thus, in the concentric breadth-first search system, the checking is performed "a" times for each vertex, where "a" indicates the average number of edges that connects to each vertex.

On the other hand, in each embodiment described below, an already generated shortest-path tree is utilized based on the concentric breadth-first search system, and only children in the shortest-path tree that is utilized, instead of all adjacent vertices, are searched for to thereby reduce the number of accesses to adjacent vertices.

Although details are described below, a shortest-path tree rooted at a vertex adjacent to the vertex v is utilized in one embodiment during generation of the shortest-path tree T(v) rooted at the vertex v. When the number of vertices adjacent to the vertex v is one, that is, when the number of shortest-path trees to be utilized is one, it may be expected in the present embodiment that the number of accesses to adjacent vertices for each vertex may be reduced from "a" to approximately 1. The reason is that, in general, a tree in which the number of vertices is n has n−1 edges, and thus the number of edges to be searched for per vertex is on average (n−1)/n, which is approximately 1. In general, however, the number of adjacent vertices is two or more, and thus the number of shortest-path trees to be utilized also becomes two or more. Thus, although the number of accesses to adjacent vertices for each vertex is not reduced from "a" to 1, a significant reduction may be expected. Although details are not described, a=2|E|/|V| is given for an undirected graph (a=|E|/|V| for a directed graph described below in the second embodiment, where "a" is the average number of edges that go out of each vertex), as is well known.

As described above, when a shortest-path tree T(v) rooted at a vertex v is to be generated in a case in which vertices adjacent to the vertex v are $w_1, w_2, \ldots,$ and $w_m$, the shortest-path trees that are utilized are $T(w_1), T(w_2), \ldots,$ and $T(w_m)$. These shortest-path trees are hereinafter referred to as "adjacent shortest-path trees of the vertex v".

When an arbitrary one of vertices adjacent to the vertex v is denoted by a vertex w, a shortest-path tree T(w) has a portion that accesses a vertex that is farther than that in the case of T(v) by distance 1, as T(w) is generated according to the concentric breadth-first search system. The portion is utilized in the present embodiment.

Figure 16:
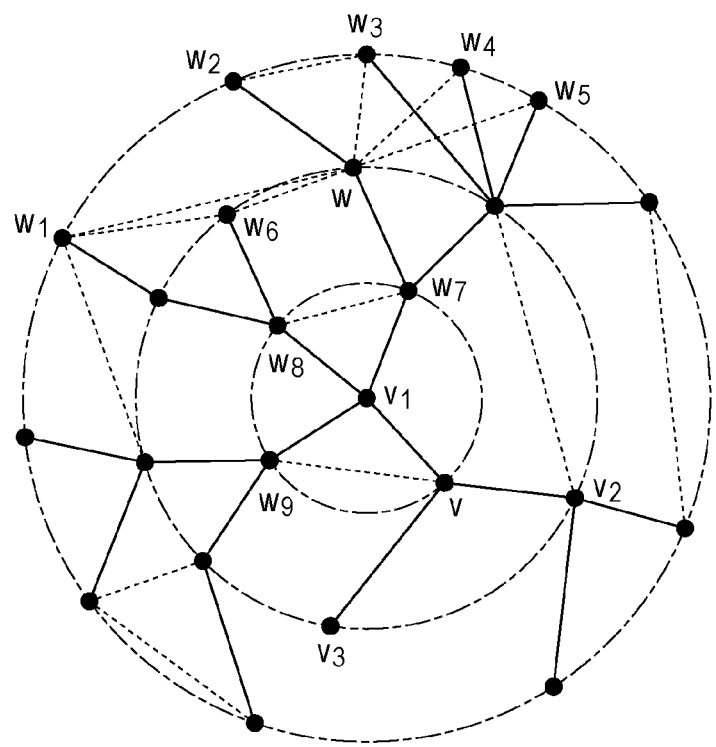
FIG. 16 is a diagram illustrating an example of utilization of an adjacent shortest-path tree, according to an embodiment.

FIG. 16 illustrates a shortest-path tree $T(v_1)$ rooted at a vertex $v_1$ and concentric rings centered at the vertex $v_1$. Now, a description will be given of how $T(v_1)$ is utilized when a shortest-path tree T(v) rooted at a vertex v at distance 1 from the vertex $v_1$ is generated. Since other vertices $v_2, v_3,$ and $w_9$ are adjacent to the vertex v, T(v) is generated also utilizing $T(v_2), T(v_3),$ and $T(w_9)$. In this case, a description will be given while paying attention to how to utilize $T(v_1)$.

Consider a case in which T(v) has been generated up to depth 3 and the shortest-path tree is further extended from the vertex w included in the ring at distance 3 from the vertex v. In the concentric breadth-first search system described above, all vertices $w_1, w_2, \ldots,$ and $w_7$ adjacent to the vertex w are searched for. However, since a child of the vertex w in $T(v_1)$ is only the vertex $w_2$, it is sufficient to search for only the vertex $w_2$ when T(v) is extended from the vertex w. That is, in this example, the number of accesses to adjacent vertices is reduced from 7 to 1.

The effect of reducing the number of accesses to adjacent vertices through utilization of the adjacent shortest-path trees of the vertex v is obtained when T(v) is extended from the vertex w at a position at distance 3 from the vertex v, as described above, but the reduction effect in the present embodiment is not obtained at a position at distance 1 from the vertex v. This is because, even when $T(v_1)$ is utilized to extend T(v) from the vertex $v_1$ at the position at distance 1 from the vertex v, children of the vertex $v_1$ are vertices v, $w_7$, $w_8$, and $w_9$ that are all adjacent to the vertex $v_1$. The effect of reducing the number of accesses according to the present embodiment appears when T(v) is extended from a vertex at distance 2 or more from the vertex v, that is, when k is 3 or more.

Each embodiment will be described below in detail. Since each embodiment is based on the concentric breadth-first search system described above, points that are different from those of the concentric breadth-first search system are mainly described, and detailed descriptions of portions that are the same as or similar to those of the concentric breadth-first search system are not given hereinafter. A description in the first embodiment is predicated on a connected undirected graph, as in the description for the concentric breadth-first search system. It is, however, easy to apply the first embodiment to a disconnected graph by making a modification to the second embodiment described below.

<First Embodiment>

Figure 17:
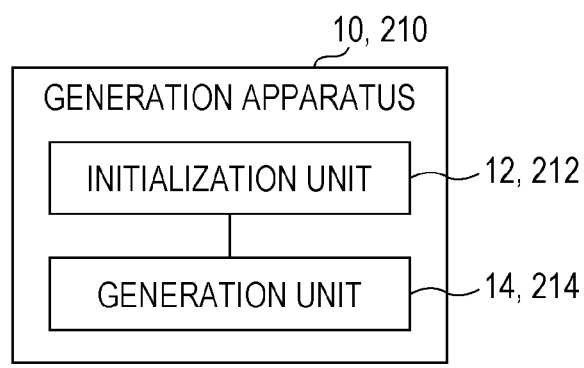
FIG. 17 illustrates a functional block diagram of a generation apparatus according to first and second embodiments.

As illustrated in FIG. 17, a generation apparatus 10 according to the first embodiment includes an initialization unit 12 and a generation unit 14. Based on information of vertices and edges included in a graph, the initialization unit 12 initializes vertex objects of the vertices and generates t-vertex objects representing shortest-path trees up to depth 0. The generation unit 14 sequentially extends the shortest-path trees in the order of depth 1, depth 2, . . . and generates or updates the vertex objects and the t-vertex objects. When the initialization unit 12 and the generation unit 14 generate a shortest-path tree, they utilize an already created adjacent shortest-path tree, as described above, unlike the case of the concentric breadth-first search system.

Now, with respect to the t-vertex objects generated or updated by the initialization unit 12 and the generation unit 14, a description will be given of differences from the t-vertex objects 101 in the concentric breadth-first search system. The vertex objects are substantially the same as the vertex objects 100 in the concentric breadth-first search system. Each t-vertex object in the present embodiment further has an attribute "original". A t-vertex object in an adjacent shortest-path tree corresponding to a t-vertex object and to be utilized is registered in the attribute "original". A description will be given below in more detail.

Figure 18:
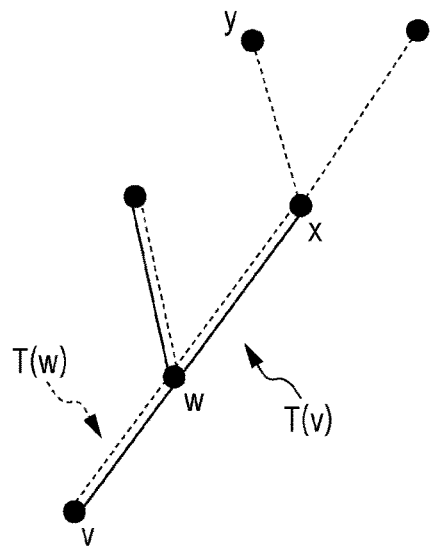
FIG. 18 is a diagram illustrating an example of utilization of an adjacent shortest-path tree, according to an embodiment.

FIG. 18 illustrates a shortest-path tree T(v) rooted at a vertex v and a shortest-path tree T(w) rooted at a vertex w adjacent to the vertex v. In FIG. 18, edges of T(v) are denoted by solid lines, and edges of T(w) are denoted by dashed lines. It is assumed that T(w) is utilized during generation of T(v). By way of example, consider a case in which a vertex y is accessed by further traversing an edge of T(w) from a vertex x, a t-vertex object t_y corresponding to the vertex y is generated, and the generated t-vertex object t_y is added to T(v). In this case, a t-vertex object t_y' corresponding to the vertex y of T(w) is accessed. This t-vertex object t_y' is set for the attribute "original" of t_y.

Figure 19:
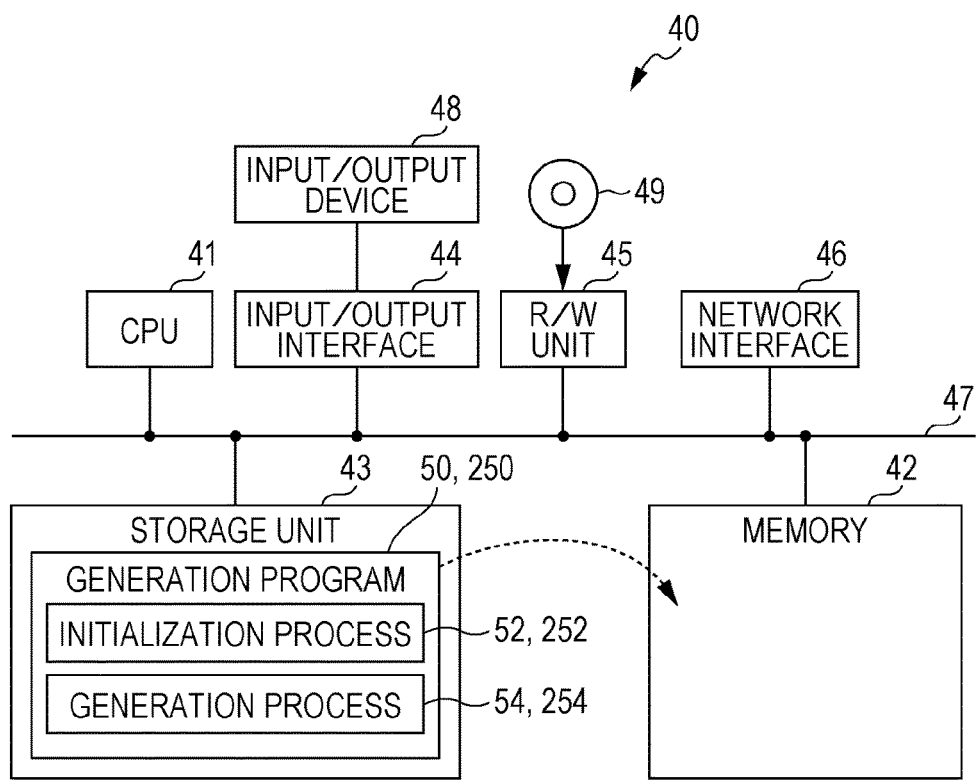
FIG. 19 is a diagram illustrating an example of a computer that functions as a generation apparatus, according to first and second embodiments.

The generation apparatus 10 may be implemented by, for example, a computer 40 illustrated in FIG. 19. The computer 40 includes a central processing unit (CPU) 41, a memory 42 serving as a temporary storage area, and a nonvolatile storage unit 43. The computer 40 further includes an input/output interface 44 to which an input/output device 48 is connected. The computer 40 further includes a reading/writing (R/W) unit 45 that controls writing data to and reading data from a recording medium 49, and a network interface 46 connected to a network, such as the Internet. The CPU 41, the memory 42, the storage unit 43, the input/output interface 44, the R/W unit 45, and the network interface 46 are connected to each other through a bus 47.

The storage unit 43 may be implemented by a hard disk drive (HDD), a solid state drive (SSD), a flash memory, or the like. The storage unit 43, which serves as a storage medium, stores therein a generation program 50 for causing the computer 40 to function as the generation apparatus 10. The CPU 41 reads the generation program 50 from the storage unit 43, loads the read generation program 50 to the memory 42, and sequentially executes processes included in the generation program 50.

The generation program 50 has an initialization process 52 and a generation process 54. By executing the initialization process 52, the CPU 41 operates as the initialization unit 12 illustrated in FIG. 17. Also, by executing the generation process 54, the CPU 41 operates as the generation unit 14 illustrated in FIG. 17. Thus, the computer 40 that executes the generation program 50 functions as the generation apparatus 10.

Functions realized by the generation program 50 may also be realized by, for example, a semiconductor integrated circuit, more specifically, an application-specific integrated circuit (ASIC) or the like.

Next, a description will be given of the operation of the generation apparatus 10 according to the first embodiment. Of the shortest-path tree generation processing executed by the generation apparatus 10, a detailed description of processes that are the same as or similar to those in the shortest-path tree generation processing in the above-described concentric breadth-first search system is not given. In addition, data structure changes according to the shortest-path tree generation processing in the first embodiment will be described with reference to FIGS. 21 and 25 to 30.

First, similarly to the concentric breadth-first search system, processing for generating shortest-path trees is started from the main processing illustrated in FIG. 11.

Figure 20:
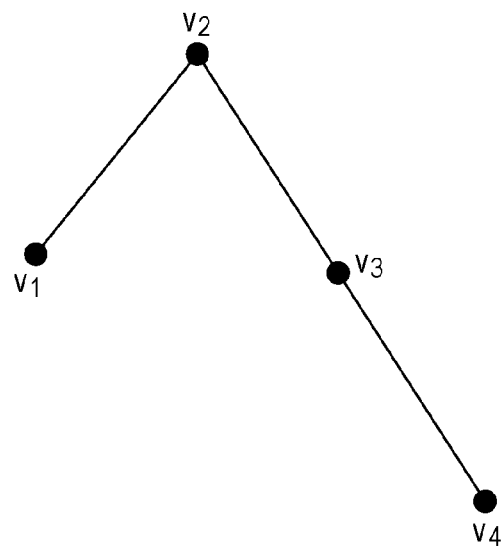
FIG. 20 is a diagram illustrating an example of an undirected graph, according to an embodiment.

In step S10 in FIG. 11, the initialization unit 12 receives data of a graph G represented by G=(V, E). The description below will be given of a case in which the graph G is a graph illustrated in FIG. 20, that is, a case of V=[$v_1$, $v_2$, $v_3$, $v_4$] and E=[$v_1\_v_2$, $v_2\_v_3$, $v_3\_v_4$]. The initialization unit 12 sets nil in t_v.original, in addition to performing initialization processing in the concentric breadth-first search system. FIG. 21 illustrates vertex objects and t-vertex objects at a point when the initialization is finished, that is, at a stage when shortest-path trees for depth 0 are generated.

In FIG. 21, 60A is a vertex object of the vertex $v_1$, 60B is a vertex object of the vertex $v_2$, 60C is a vertex object of the vertex $v_3$, and 60D is a vertex object of the vertex $v_4$. Also, 61A is a t-vertex object of $t\_v_{11}$, 61B is a t-vertex object of $t\_v_{22}$, 61C is a t-vertex object of $t\_v_{33}$, and 61D is a t-vertex object of $t\_v_{44}$. When the individual vertex objects 60A to 60D in the first embodiment are described without distinction therebetween, they are simply referred to as "vertex objects 60", and when the individual t-vertex objects 61A to 61D are described without distinction therebetween, they are simply referred to as "t-vertex objects 61".

As illustrated in FIG. 21, this case differs from the case of the concentric breadth-first search system illustrated in FIG. 7 in that each t-vertex object 61 further has the attribute "original".

Main processing and processing for depth k in this case are analogous to those (illustrated in FIGS. 11 and 12) in the concentric breadth-first search system. However, since the details of the processing (illustrated in FIG. 12) for generating a shortest-path tree rooted at the vertex v for depth k are different, the processing for generating a shortest-path tree rooted at the vertex v for depth k in the first embodiment will be described with reference to FIGS. 22 to 24. Processes that are the same as or similar to those in the processing for generating a shortest-path tree rooted at the vertex v for depth k in the concentric breadth-first search system are denoted by the same reference numerals, and detailed descriptions thereof are not given hereinafter.

Figure 22:
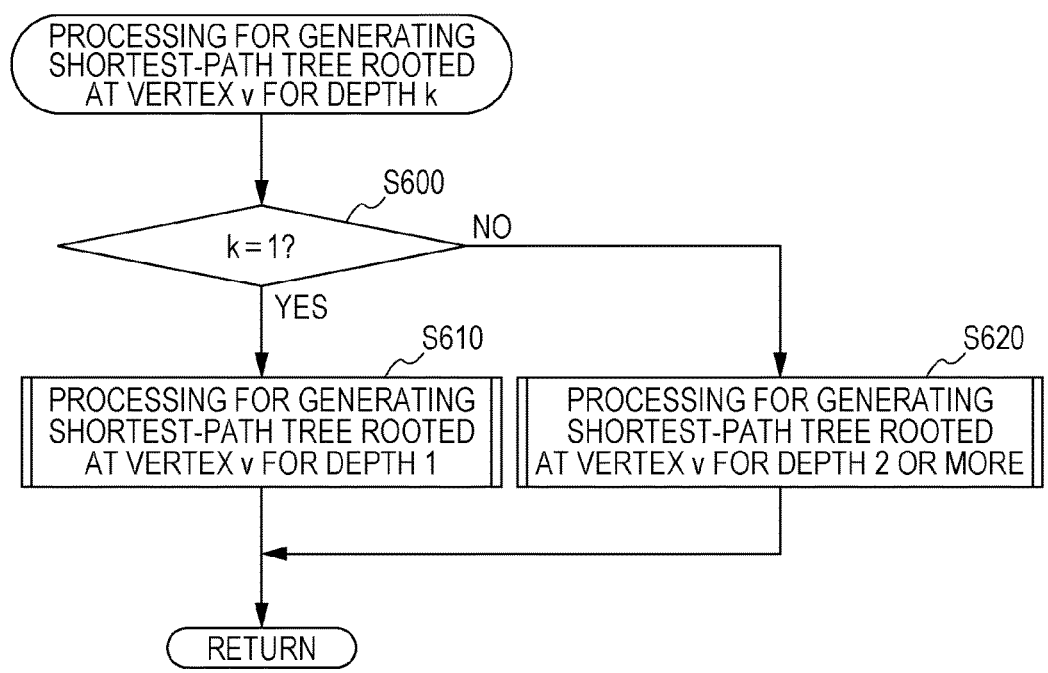
FIG. 22 is a diagram illustrating an example of an operational flowchart for generating a shortest-path tree rooted at a vertex v for depth k in a first embodiment.

In step S600 in FIG. 22, the generation unit 14 determines whether or not the variable k indicating the depth is 1. When k is 1, the process proceeds to step S610, processing (illustrated in FIG. 23) for generating a shortest-path tree rooted at the vertex v for depth 1 is executed, and then the process returns to the processing for depth k which is illustrated in FIG. 12. On the other hand, when k is not 1, that is, when k is 2 or more, the process proceeds to step S620, processing (illustrated in FIG. 24) for generating a shortest-path tree rooted at the vertex v for depth 2 or more is executed, and the process returns to the processing for depth k which is illustrated in FIG. 12.

Figure 23:
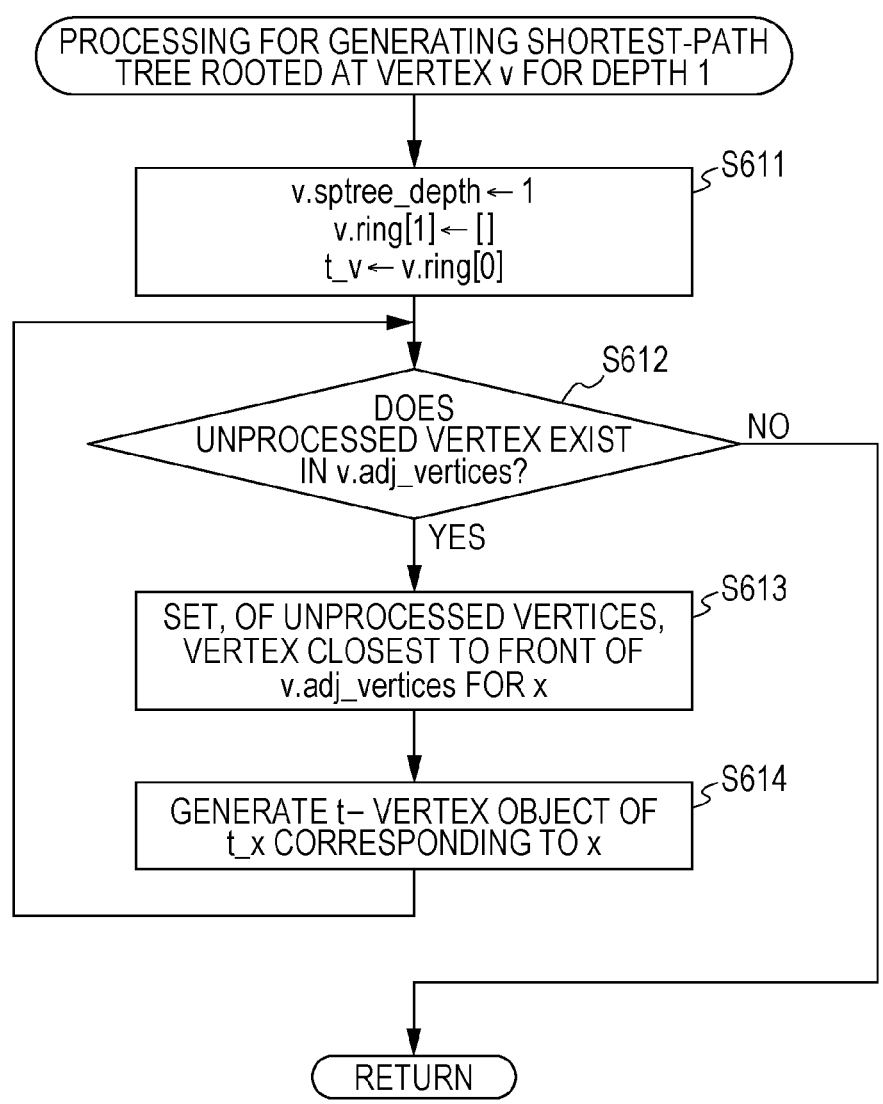
FIG. 23 is a diagram illustrating an example of an operational flowchart for generating a shortest-path tree rooted at vertex v for depth 1 in a first embodiment.
Figure 24:
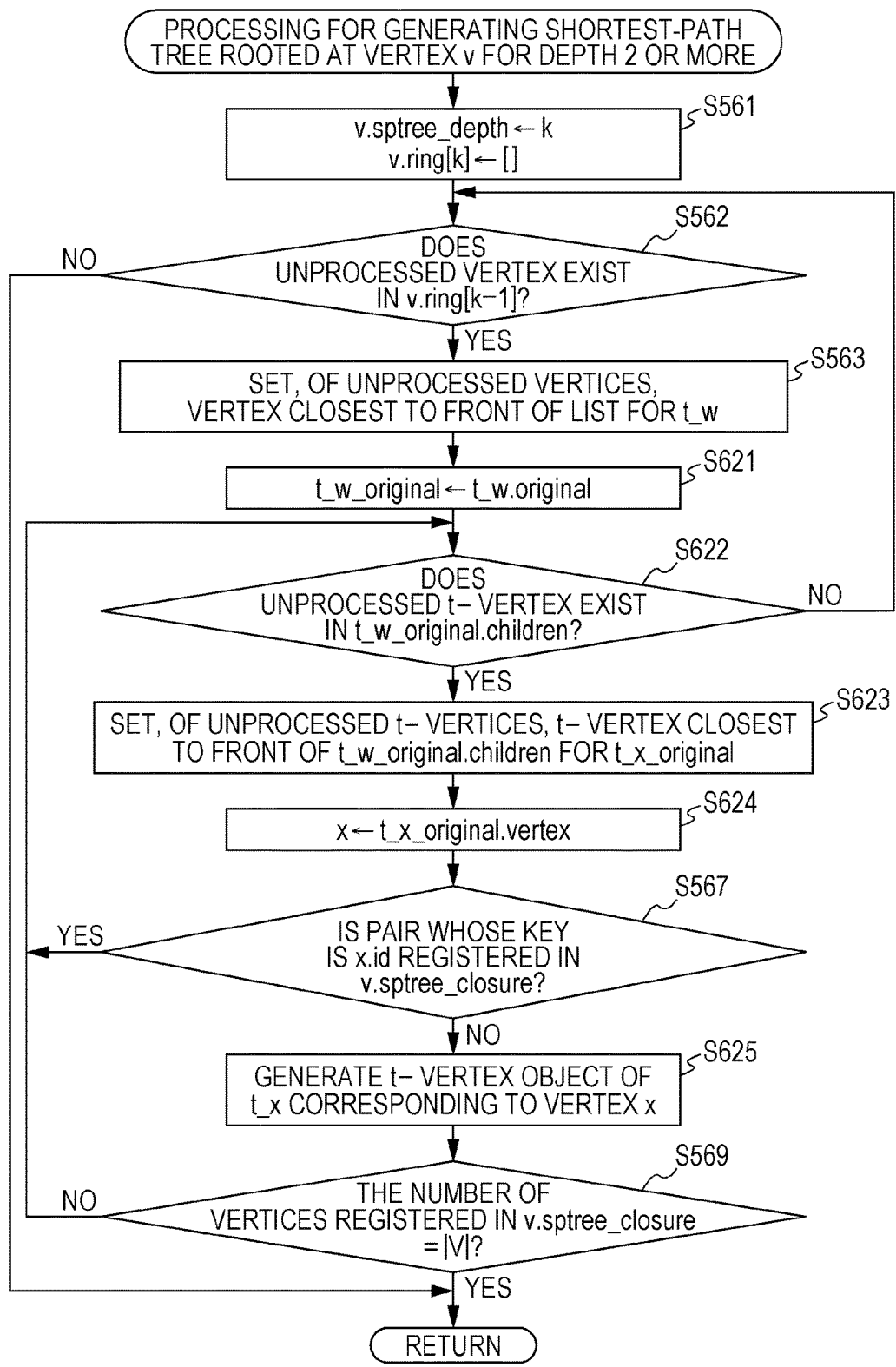
FIG. 24 is a diagram illustrating an example of an operational flowchart for generating a shortest-path tree rooted at vertex v for depth 2 or more in a first embodiment.

In step S611 in FIG. 23, the generation unit 14 sets 1 for v.sptree_depth, adds v.ring[1] as an attribute, and sets an empty list [ ] for v.ring[1]. The generation unit 14 also sets the t-vertex, registered in v.ring[0], for t_v.

In the processing for generating the shortest-path tree rooted at the vertex v for depth k in the concentric breadth-first search system, after step S561 corresponding to step S611 described above, t_w is extracted from v.ring[k−1], and the vertex w is obtained from t_w.vertex. However, for k=1, t_w=t_v is given, and the vertex v corresponding to t_v has also been found in the process in step S54, so that the process for obtaining the vertex w may be omitted.

Next, in step S612, the generation unit 14 determines whether or not a vertex on which subsequent processes have not been performed exists in v.adj_vertices. When an unprocessed vertex exists, the process proceeds to step S613, and when no unprocessed vertex exists, the processing for generating the shortest-path tree rooted at the vertex v for depth 1 is finished, and the process returns to FIG. 22.

In step S613, the generation unit 14 extracts, of unprocessed vertices that exist in v.adj_vertices, the vertex closest to the front of v.adj_vertices and sets the extracted vertex for x. For example, for id=1, the vertex object $v_2$ registered in $v_1$.adj_vertices of the vertex object 60A of the vertex $v_1$ is extracted, and the vertex $v_2$ is set for the vertex x.

Next, in step S614, the generation unit 14 generates a t-vertex object 61 of t_x corresponding to the vertex x. The generation unit 14 then registers "x" in Lx.vertex, sets an empty list [ ] for t_x.children, registers t_v in t_x.parent, and registers the t-vertex object registered in x.sptree for t_x.original. The generation unit 14 also adds t_x to the tail of a list registered in t_v.children. The generation unit 14 also adds a pair in which the key is x.id and the value is t_x to a hash table registered in v.sptree_closure. The generation unit 14 also adds t_x to the tail of a list registered in v.ring[1].

For example, in the above-described example of id=1, a t-vertex object 61E (see FIG. 25) of $t\_v_{12}$ corresponding to the vertex $v_2$ extracted as the vertex x is generated. Then, $v_2$ is registered in $t\_v_{12}$.vertex, $t\_v_{11}$ is registered in $t\_v_{12}$.parent, and $t\_v_{22}$ registered in $v_2$.sptree is registered in $t\_v_{12}$.original. Also, $t\_v_{12}$ is added to the tail of a list registered in $t\_v_{11}$.children. Also, a pair (2, $t\_v_{12}$) is added to the hash table registered in $v_1$.sptree_closure, and $t\_v_{12}$ is added to the tail of a list registered in $v_1$ring[1].

As a result, as illustrated in FIG. 25, the t-vertex object 61E is generated, and the vertex object 60A and the t-vertex object 61A are updated. FIGS. 25 and 26 illustrate vertex objects 60 and t-vertex objects 61 at a stage when the processing for depth k=1 is finished. In the processing for depth k=1, the t-vertex object 61E of t_$v_{12}$, a t-vertex object 61F of t_$v_{21}$, and a t-vertex object 61G of t_$v_{23}$ are generated. In addition, a t-vertex object 61H of t_$v_{32}$, a t-vertex object 61I of t_$v_{34}$, and a t-vertex object 61J of t_$v_{43}$ are generated.

For k=1, since only t_v is registered in v.sptree_closure, and none of the vertices adjacent to t_v are registered, the determination as to whether or not x.id exists in v.sptree_closure may be omitted.

Next, after steps S561 and S562 in the processing (illustrated in FIG. 24) for generating the shortest-path tree rooted at the vertex v for depth 2 or more, the process proceeds to step S563. In step S563, the generation unit 14 extracts, of unprocessed vertices that exist in v.ring[k−1], the vertex closest to the front of a list registered in v.ring[k−1] and sets the extracted vertex for t_w.

Next, in step S621, the generation unit 14 sets the t-vertex object, registered in t_w.original of the t-vertex object 61 of t_w, for t_w_original.

Next, in step S622, the generation unit 14 determines whether or not a t-vertex on which subsequent processes have not been performed exists in t_w_original.children. When an unprocessed t-vertex exists, the process proceeds to step S623, and when no unprocessed t-vertex exists, the process returns to step S562.

In step S623, the generation unit 14 extracts, of unprocessed t-vertices that exist in t_w_original.children, the t-vertex closest to the front of t_w_original.children and sets the extracted t-vertex for t_x_original. In the concentric breadth-first search system described above, vertices adjacent to vertices corresponding to leaves of a generated shortest-path tree are all searched for during extension of a shortest-path tree rooted at a vertex v. In contrast, in the present embodiment, in step S623, only a child of a shortest-path tree rooted at a vertex adjacent to the vertex v is searched for.

For example, for k=2 and id=1, t_$v_{12}$ is extracted from $v_1$ring[1] as t_w. Then, t_$v_{22}$ is extracted from t_$v_{12}$.original as t_w_original. In addition, t_$v_{21}$ is extracted from the front of t_$v_{22}$.children.

Next, in step S624, the generation unit 14 sets the vertex object, registered in t_x_original.vertex, for the vertex x.

Next, in step S567, the generation unit 14 determines whether or not a pair whose key is the vertex identifier registered in x.id is registered in the hash table registered in v.sptree_closure. When the pair is not registered, the process proceeds to step S625, and when the pair is registered, the process returns to step S622.

In step S625, the generation unit 14 generates a t-vertex object 61 of t_x corresponding to the vertex x. The generation unit 14 then registers x in Lx.vertex, sets an empty list [ ] for t_x.children, registers t_w in t_x.parent, and registers t_x_original in t_x.original. The generation unit 14 adds t_x to the tail of a list registered in t_w.children. The generation unit 14 also adds a pair in which the key is x.id and the value is t_x to the hash table registered in v.sptree_closure. The generation unit 14 also adds t_x to the tail of a list registered in v.ring[k].

For example, in the above-described example of k=2 and id=1, it is assumed that t_$v_{23}$, which is the second in t_$v_{22}$.children, is extracted as t_w_original. In this case, the vertex $v_3$ registered in t_$v_{23}$.vertex is set for the vertex x. Since a pair in which the key is "3" is not registered in the hash table registered in $v_1$.sptree_closure, a t-vertex object 61K (see FIG. 27) of t_$v_{13}$ corresponding to vertex $v_3$ is generated.

More specifically, $v_3$ that is x is registered in t_$v_{13}$.vertex, an empty list [ ] is set for t_$v_{13}$.children, t_$v_{12}$ is t_w is registered in t_$v_{13}$.parent, and t_$v_{23}$ is registered in t_$v_{13}$.original. Also, t_$v_{13}$ is added to the tail of a list registered in t_$v_{12}$.children. Then, a pair (3, t_$v_{13}$) is added to the hash table registered in $v_1$.sptree_closure, and t_$v_{13}$ is added to the tail of a list registered in $v_1$ring[2].

Figure 28:
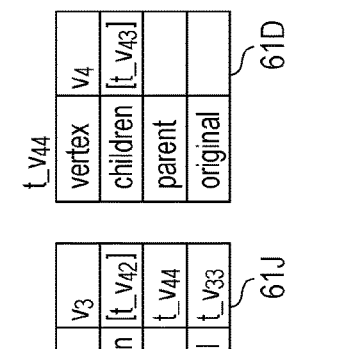
FIG. 28 is a diagram illustrating an example of vertex objects and t-vertex objects at a stage when a shortest-path tree is generated up to depth 2 in a first embodiment.

FIGS. 27 and 28 illustrate vertex objects 60 and t-vertex objects 61 at a stage when the processing for depth k=2 is finished. As a result of the processing for depth k=2, the t-vertex object 61K of t_$v_{13}$, a t-vertex object 61L of t_$v_{24}$, a t-vertex object 61M of t_$v_{31}$, and a t-vertex object 61N of t_$v_{42}$ are generated. FIGS. 29 and 30 illustrate vertex objects 60 and t-vertex objects 61 at a stage when the processing for depth k=3 is finished. As a result of the processing for depth k=3, a t-vertex object 61O of t_$v_{14}$ and a t-vertex object 61P of t_$v_{41}$ are generated.

The effect of reducing the number of accesses to adjacent vertices according to the first embodiment is obtained when a shortest-path tree for k≥3 is generated. A description will be given of an example of a case in which a shortest-path tree rooted at the vertex $v_1$ for depth 3 is generated for the graph illustrated in FIG. 20. That is, this example corresponds to a case of k=3 and id=1. In this case, since t_$v_{13}$ is registered in $v_1$ring[2], the shortest-path tree is further extended from t_$v_{13}$. During the extension, in the concentric breadth-first search system described above, the adjacent vertices of the vertex $v_3$ corresponding to $Ly_n$, that is, the vertices $v_2$ and $v_4$ registered in $v_3$.adj_vertices, are searched for. That is, two vertices are accessed.

In contrast, in the first embodiment, an already generated shortest-path tree is utilized during search for a next t-vertex through extension of a shortest-path tree from t_$v_{13}$. In this case, t_$v_{23}$ registered in t_$v_{13}$.original is a t-vertex that is included in a shortest-path tree already generated at a stage of k=2 when t_$v_{13}$ was added to $v_1$ring[2] and that also corresponds to the vertex $v_3$ that is the same as t_$v_{13}$. Thus, a next t-vertex of t_$v_{13}$ may be narrowed down to a next t-vertex that further extends from t_$v_{23}$. Accordingly, only a child of t_$v_{23}$, that is, only t_$v_{24}$ registered in t_$v_{23}$.children, is searched for. As a result, in this example, the number of accesses to adjacent vertices, the number being 2 in the concentric breadth-first search, may be reduced to 1.

As described above, during generation of a shortest-path tree rooted at each vertex included in a graph while extending the shortest-path tree in the depth direction, the generation apparatus according to the first embodiment searches for a child of an already generated shortest-path tree, rather than searching for all adjacent vertices. With this arrangement, it is possible to minimize the redundant processing that occurs during search for all adjacent vertices and the searching for a redundant path, and it is possible to reduce the amount of calculation for generating a shortest-path tree.

<Second Embodiment>

A second embodiment will be described next. In the second embodiment, detailed descriptions of portions that are the same as or similar to those in the first embodiment are not given hereinafter.

Although a case in which the processing is performed on an unweighted undirected graph has been described in the first embodiment, a case in which the processing is performed on an unweighted directed graph, that is, a graph in which the edges between vertices are directed, will be described in the second embodiment. In a directed graph, determining a shortest path between two vertices is also important for data analysis for a graph.

For example, network-based data of a human relationship in an SNS in which the connection between users is formed in a manner that one user follows the other user, like in Twitter (registered trademark), may be represented by a directed graph. In such a directed graph, by determining a shortest path within distance d for a vertex corresponding to each user, it is possible to identify, for each user, a person who has a strong connection due to a following/followed relationship.

For example, although a Rubik's Cube (registered trademark) may generally be rotated both rightward and leftward, it is assumed in this case that a rule that permits only the rightward turn is added. In this case, the state of transition between facets of the Rubik's Cube may be represented by a directed graph in which vertices correspond to the facets of the Rubik's cube and the state of transition from one facet to another facet by a right turn is connected by an edge from a vertex corresponding to one facet to a vertex corresponding to another facet. In this directed graph, the shortest path from the vertex corresponding to one facet to the vertex corresponding to the final facet (the state in which each of all of the faces has one color) represents an optimal solution (a minimum number of moves).

Figure 31:
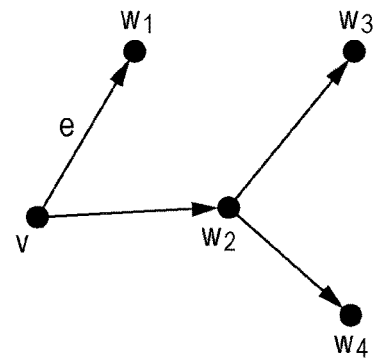
FIG. 31 is a diagram illustrating an example of a directed graph that is reachable from a vertex, according to an embodiment.

Also, since edges connecting vertices in a directed graph are directed, the definition "being adjacent" differs from that in the case of an undirected graph. In a directed graph, when there is a connection from a vertex v to a vertex $w_1$ through one edge e, as illustrated in FIG. 31, the vertex $w_1$ is said to be adjacent from the vertex v or the vertex v is said to be adjacent to the vertex $w_1$. This edge e is said to go out of the vertex v and go into the vertex $w_1$.

In a vertex sequence $v_0, v_1, \ldots,$ and $v_n$ in a directed graph, when a vertex $v_i$ is adjacent from a vertex $v_{i-1}$ for i ($1 \le i \le n$) in accordance with the above-described definition "being adjacent", this vertex sequence is referred to as a "path". An adjacent vertex list of a vertex v in a directed graph refers to a list including vertices adjacent from the vertex v. The number of edges that go out of the vertex v is referred to as the "outdegree of the vertex v". That is, the outdegree of the vertex v is the number of vertices included in the adjacent vertex list of the vertex v. Similarly, the number of edges that go into the vertex v is referred to as the "indegree of the vertex v".

Figure 32:
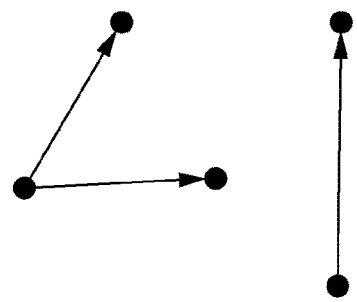
FIG. 32 is a diagram illustrating an example of a disconnected directed graph when viewed as an undirected graph, according to an embodiment.

In the second embodiment, when a directed graph is viewed as an undirected graph, that is, is viewed regardless of the directions of the edges, and there is a path from one of two vertices in a subgraph to the other vertex, the subgraph is said to be connected. For example, the directed graph illustrated in FIG. 31 is said to be "connected when viewed as an undirected graph" or is simply said to be "connected". In contrast, as illustrated in FIG. 32, when a directed graph is disconnected when viewed as an undirected graph, the directed graph is said to be "disconnected when viewed as an undirected graph" or is simply said to be "disconnected".

Figure 33:
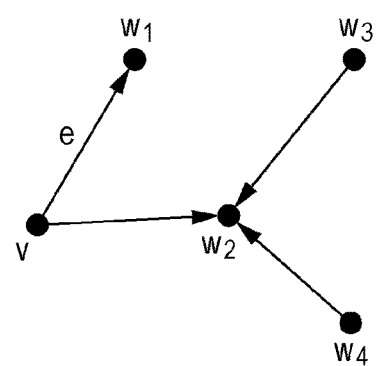
FIG. 33 is a diagram illustrating an example of a directed graph in which one vertex is not reachable from any vertex, according to an embodiment.

In the second embodiment, when there is a path from one vertex v in a subgraph to any one of vertices in the subgraph, the subgraph is said to be "reachable from the vertex v". The directed graph illustrated in FIG. 31 is an example of a directed graph in which all vertices are reachable from a vertex v. Since the vertex $w_1$ is not adjacent to the vertex v, the vertex v is not reachable from the vertex $w_1$. The same also applies to the vertex $w_2, w_3,$ and $w_4$. FIG. 33 is an example of a directed graph in which a vertex v is not reachable from any vertex.

In the second embodiment, a subgraph that is reachable from a vertex v and that does not include a cycle when the graph is viewed as an undirected graph is referred to as a "tree". In the second embodiment, a "shortest-path tree" is a tree that represents shortest paths to all vertices, except for a vertex v, which are reachable from the vertex v. A shortest-path tree in a case predicated on an undirected graph has been defined as a tree representing shortest paths from a vertex v to all vertices. However, the second embodiment for a directed graph described below is also applicable to a disconnected graph. Accordingly, as described above, a shortest-path tree is defined as a tree representing shortest paths to all vertices, except for a vertex v, which are reachable from the vertex v. That is, the "being reachable", which is not included in the definition for a shortest-path tree in the case predicated on an undirected graph, has been added. It is easy to make a modification so that the first embodiment for an undirected graph is applied to a disconnected graph, as in the case of a directed graph.

As illustrated in FIG. 17, a generation apparatus 210 according to the second embodiment includes an initialization unit 212 and a generation unit 214. The initialization unit 212 and the generation unit 214 are substantially the same as the initialization unit 12 and the generation unit 14 in the first embodiment, except that the graph to be processed is a directed graph and the method for determining the finishing of the shortest-path tree generation processing is different.

The generation apparatus 210 may be implemented by, for example, the computer 40 illustrated in FIG. 19. The storage unit 43 in the computer 40 stores therein a generation program 250 for causing the computer 40 to function as the generation apparatus 210. The CPU 41 reads the generation program 250 from the storage unit 43, loads the generation program 250 into the memory 42, and sequentially executes processes included in the generation program 250.

The generation program 250 has an initialization process 252 and a generation process 254. By executing the initialization process 252, the CPU 41 operates as the initialization unit 212 illustrated in FIG. 17. Also, by executing the generation process 254, the CPU 41 operates as the generation unit 214 illustrated in FIG. 17. Thus, the computer 40 that executes the generation program 250 functions as the generation apparatus 210.

Functions realized by the generation program 250 may also be realized by, for example, a semiconductor integrated circuit, more specifically, an ASIC or the like.

Next, a description will be given of an operation of the generation apparatus 210 according to the second embodiment. With respect to the shortest-path tree generation processing to be executed by the generation apparatus 210, processes that are substantially the same as or similar to those of the shortest-path tree generation processing using the concentric breadth-first search system and the shortest-path tree generation processing in the first embodiment are denoted by the same reference numerals, and detailed descriptions thereof are not given.

Figure 34:
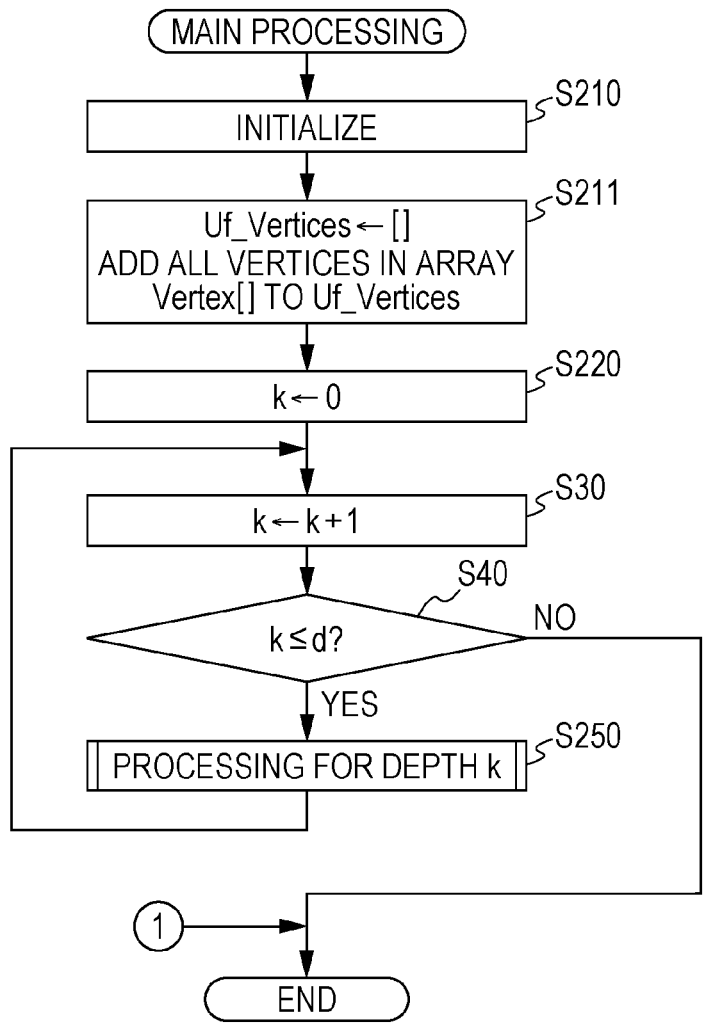
FIG. 34 is a diagram illustrating an example of an operational flowchart for main processing in shortest-path tree generation processing in a second embodiment.
Figure 35:
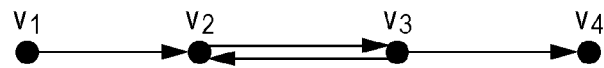
FIG. 35 is a diagram illustrating an example of a directed graph, according to an embodiment.

In step S210 in the main processing illustrated in FIG. 34, the initialization unit 212 receives data of a graph G represented by G=(V, E). The description below will be given of a case in which the graph G is a graph illustrated in FIG. 35, that is, a case of V=[$v_1, v_2, v_3, v_4$] and E=[$v_1 \rightarrow v_2, v_2 \rightarrow v_3, v_3 \rightarrow v_2, v_3 \rightarrow v_4$]. Also, $v_i \rightarrow v_j$ denotes an edge that goes out of a vertex $v_i$ and goes into a vertex $v_j$. The initialization unit 212 executes initialization processing that is the same as or similar to that in step S10 in the main processing in the shortest-path tree generation processing in the first embodiment. In the second embodiment, since the graph to be processed is a directed graph, a vertex that is adjacent from a vertex v, that is, a vertex into which an edge that goes out of the vertex v goes, is registered in the adjacent vertex list v.adj_vertices of the vertex v. FIG. 36 illustrates vertex objects and t-vertex objects at a point when the initialization is finished, that is, at a stage when shortest-path trees for depth 0 are generated.

In FIG. 36, 260A is a vertex object of the vertex $v_1$, 260B is a vertex object of the vertex $v_2$, 260C is a vertex object of the vertex $v_3$, and 260D is a vertex object of the vertex $v_4$. Also, 261A is a t-vertex object of $t\_v_{11}$, 261B is a t-vertex object of $t\_v_{22}$, 261C is a t-vertex object of $t\_v_{33}$, and 261D is a t-vertex object of $t\_v_{44}$.

In step S211, all vertices included in an array Vertex[ ] are added to a list Uf_Vertices for managing each vertex on which processing for generating a shortest-path tree rooted at the vertex is not completed. Next, in step S220, the generation unit 214 sets 0 for the variable k indicating the depth of a shortest-path tree. Next, in step S30, the generation unit 214 increments the variable k by 1. In step S40, the generation unit 214 determines whether or not the variable k is smaller than a value d pre-set as a depth for generating a shortest-path tree. When the variable k is smaller than or equal to d, the process proceeds to step S250.

When it is desired to obtain shortest paths to all vertices reachable from each of all the vertices, it is sufficient to set the depth to d=|V|−1, as in the first embodiment. Even if the depth is set to d=|V|−1, when the list Uf_Vertices becomes [ ] (an empty list), the shortest-path tree generation is finished before the variable k reaches |V|−1, except for a graph in which all vertices are linearly connected, and thus there is no problem in terms of efficiency.

Figure 37:
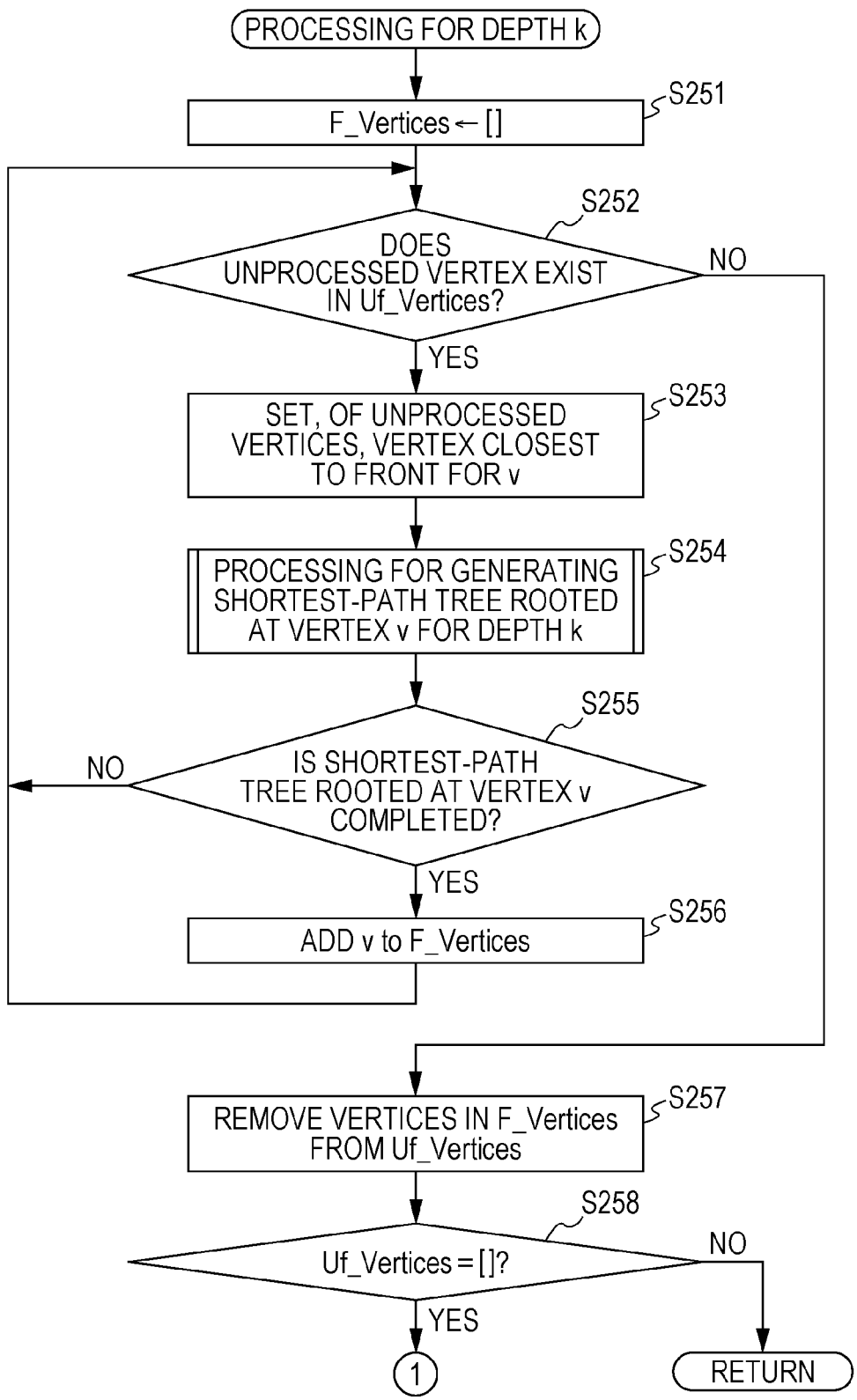
FIG. 37 is a diagram illustrating an example of an operational flowchart for processing for depth k in a second embodiment.

In step S250, the generation unit 214 executes processing for depth k which is illustrated in FIG. 37.

In step S251 in FIG. 37, the generation unit 214 sets an empty list [ ] for a list F_Vertices for managing each vertex on which the generation of a shortest-path tree rooted at a vertex v is completed.

Next, in step S252, the generation unit 214 determines whether or not a vertex on which subsequent processes have not been performed exists in the list Uf_Vertices. When an unprocessed vertex exists, the process proceeds to step S253.

In step S253, the generation unit 214 extracts, of unprocessed vertices that exist in the list Uf_Vertices, the vertex closest to the front of Uf_Vertices, and sets the extracted vertex for the vertex v to be processed. Next, in step S254, the generation unit 214 executes the processing (illustrated in FIG. 22) for generating the shortest-path tree rooted at the vertex v for depth k. In the processing for generating the shortest-path tree rooted at the vertex v for depth k in the second embodiment, the processing for generating a shortest-path tree rooted at the vertex v for depth 1 in step S610 and the processing for generating a shortest-path tree rooted at the vertex v for depth 2 or more in step S620 are different from those in the first embodiment.

Figure 38:
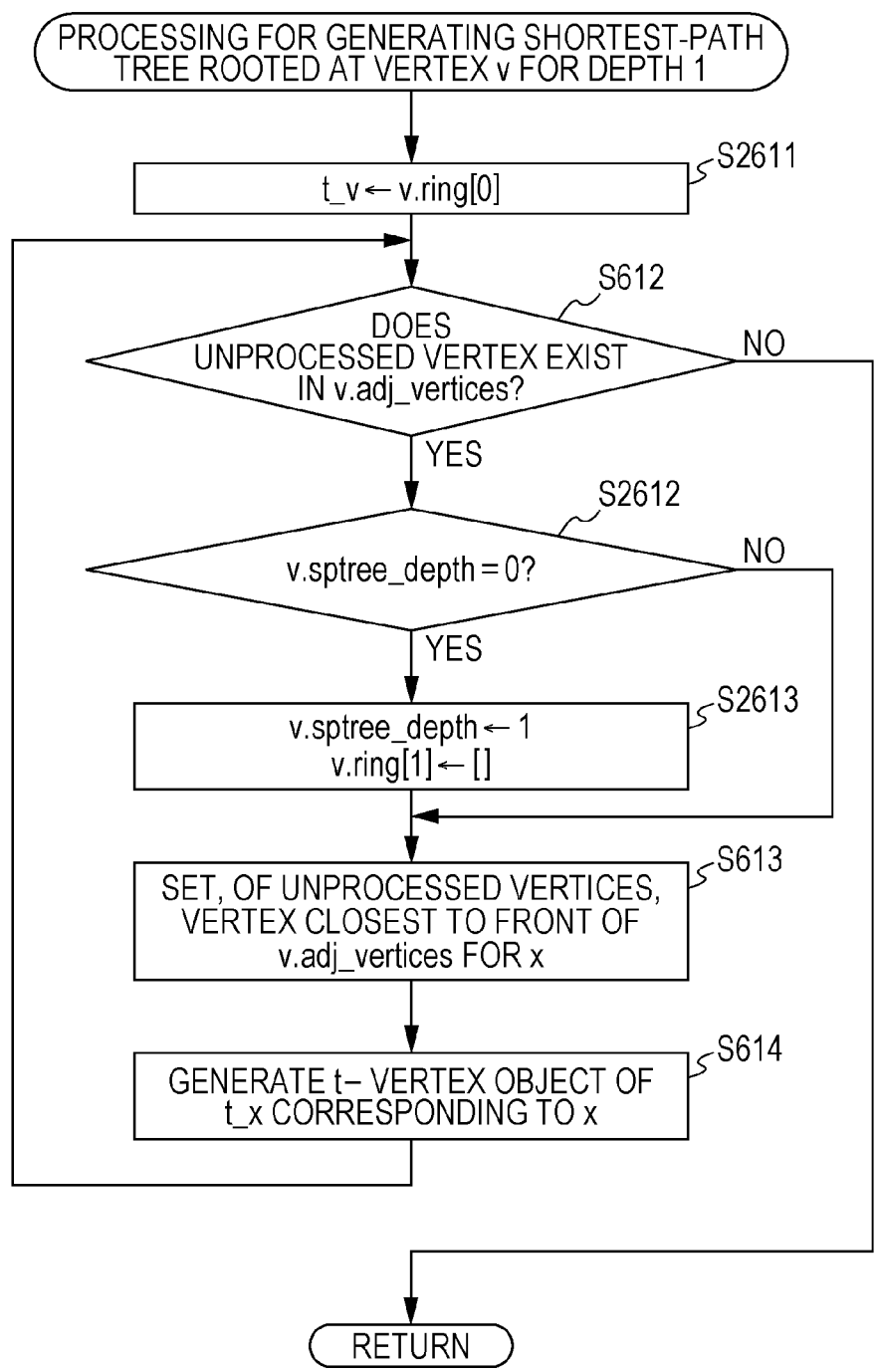
FIG. 38 is a diagram illustrating an example of an operational flowchart for generating a shortest-path tree rooted at vertex v for depth 1 in a second embodiment.

First, the processing for generating a shortest-path tree rooted at the vertex v for depth 1 according to the second embodiment will be described with reference to FIG. 38.

In step S2611, the generation unit 214 sets the t-vertex, registered in v.ring[0], for t_v. Next, in step S612, the generation unit 214 determines whether or not a vertex on which subsequent processes have not been performed exists in v.adj_vertices. When an unprocessed vertex exists, the process proceeds to step S2612.

In step S2612, the generation unit 214 determines whether or not v.sptree_depth is 0. When v.sptree_depth is 0, the process proceeds to step S2613, and when v.sptree_depth is not 0, the process proceeds to step S613.

In step S2613, the generation unit 214 sets 1 for v.sptree_depth, adds v.ring[1] as an attribute, and sets an empty list [ ] for v.ring[1].

Next, in step S613, the generation unit 214 extracts, of unprocessed vertices that exist in v.adj_vertices, the vertex closest to the front of v.adj_vertices, and sets the extracted vertex for a vertex x. Next, in step S614, the generation unit 214 generates a t-vertex object t_x corresponding to the vertex x, as in the first embodiment, and performs associated processing. Thereafter, the process returns to step S612. When it is determined in step S612 that no unprocessed vertex exists, the processing for generating the shortest-path tree rooted at the vertex v for depth 1 is finished, and the process returns to the processing for depth k which is illustrated in FIG. 37.

Next, in step S255, the generation unit 214 determines whether or not the shortest-path tree rooted at the vertex v is completed in step S254 described above. More specifically, when there is no change between v.sptree_depth before the process in step S254 and v.sptree_depth after the process, or when the number of vertices registered in v.sp-tree_closure is |V|, the result of the determination made by the generation unit 214 in step S255 is affirmative. When the result of the determination in step S255 is affirmative, the process proceeds to step S256, and the generation unit 214 adds the vertex v to the list F_Vertices. When the result of the determination in step S255 is negative, the process returns to step S252.

Figure 39:
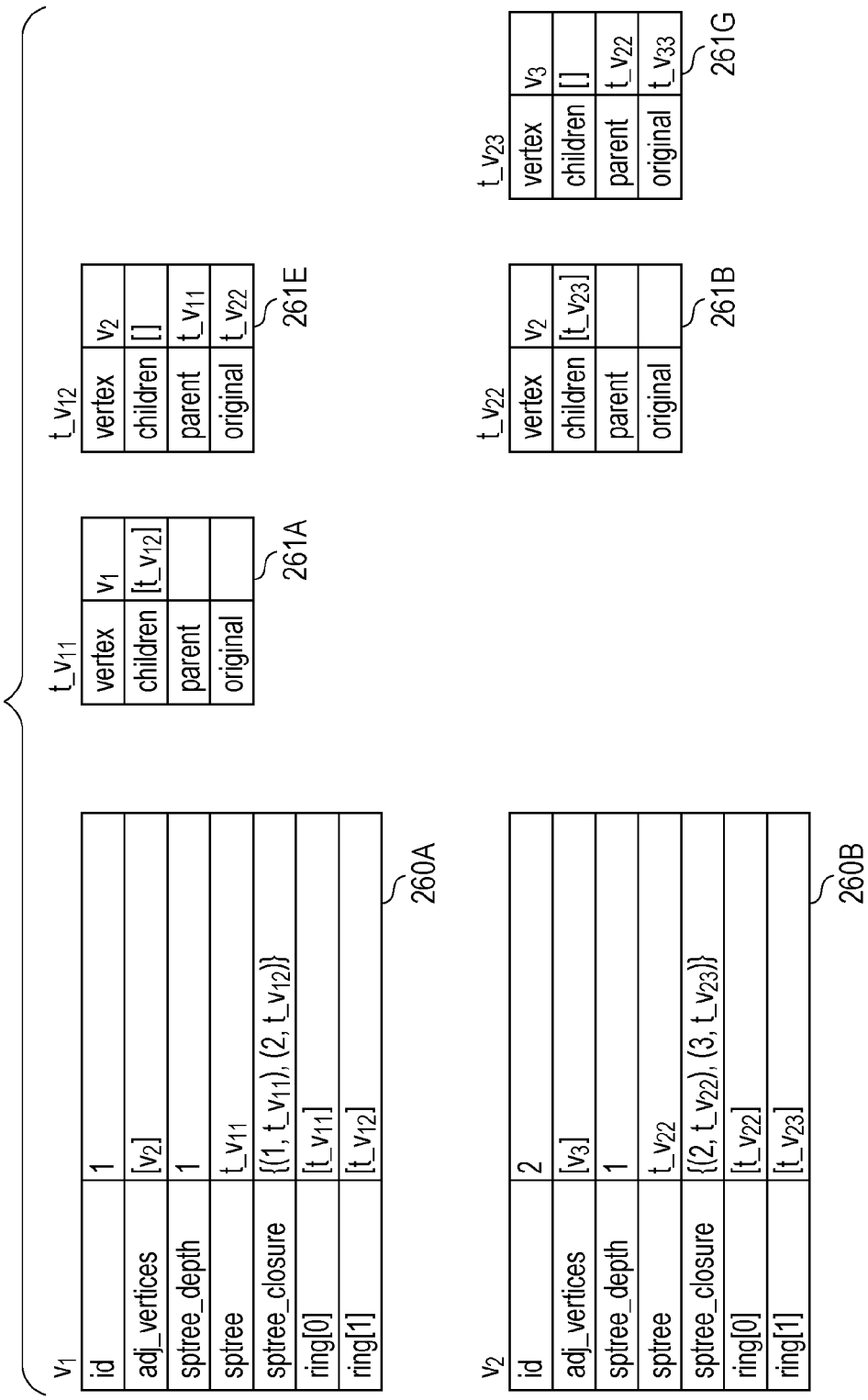
FIG. 39 is a diagram illustrating an example of vertex objects and t-vertex objects at a stage when a shortest-path tree is generated up to depth 1 in a second embodiment.

FIGS. 39 and 40 illustrate vertex objects 260 and t-vertex objects 261 at a stage when the processing for generating the shortest-path tree rooted at the vertex v for depth 1 is finished. When the vertex v is $v_4$, $v_4$.sptree_depth, 0, after the process in steps S254 has not changed from $v_4$.sptree_depth, 0, before the process, so that the result of the determination is step S255 is affirmative, and in step S256, the vertex $v_4$ is added to the list F_Vertices.

When it is determined in step S252 described above that a vertex on which the subsequent processes have not been performed does not exist in the list Uf_Vertices, the process proceeds to step S257. In step S257, the generation unit 214 removes the vertices registered in the list F_Vertices from the vertices registered in the list Uf_Vertices.

Next, in step S258, the generation unit 214 determines whether or not the list Uf_Vertices has become empty. When the list Uf_Vertices has become empty, this indicates that the generation of the shortest-path tree rooted at each vertex is completed for all vertices, and thus the shortest-path tree generation processing is finished. On the other hand, when a vertex still exists in the list Uf_Vertices, the process proceeds to step S30 in the main processing illustrated in FIG. 34.

Next, the processing for generating a shortest-path tree rooted at the vertex v for depth 2 or more, the processing being executed in step S620 in FIG. 22, will be described with reference to FIG. 41.

When the result of determination in step S567 is negative after finishing processes in steps S562, S563, and S621 to S624, which are substantially the same as those in the processing in the first embodiment for generating the shortest-path tree rooted at the vertex v for depth 2 or more, the process proceeds to step S2621.

In step S2621, the generation unit 214 determines whether or not v.sptree_depth is k−1. When v.sptree_depth is k−1, the process proceeds to step S561, and when v.sptree_depth is not k−1, the process proceeds to step S625.

In step S561, the generation unit 214 sets k for v.sp-tree_depth, adds v.ring[k] as an attribute, and sets an empty list [ ] for v.ring[k].

Thereafter, as in the first embodiment, processes in steps S625 and S569 are executed. When the result of the determination in step S562 is negative, the process returns to the processing for depth k which is illustrated in FIG. 37.

FIGS. 42 and 43 illustrate vertex objects and t-vertex objects at a stage when the processing for depth k=2 is finished. After the stage when the processing for depth k=1 is finished (FIGS. 39 and 40), a vertex object 261K of $t\_v_{13}$, a t-vertex object 261L of $t\_v_{24}$, and a t-vertex object 261K of $t\_v_{13}$ are generated. FIGS. 44 and 45 illustrate vertex objects and t-vertex objects at a stage when the processing for depth k=3 is finished. After the stage when the processing for depth k=2 is finished (FIGS. 42 and 43), a t-vertex object 2610 of $t\_v_{14}$ is generated.

For k=3 and id=1, since $t\_v_{13}$ is registered in $v_1$ring[2], the shortest-path tree is further extended from $t\_v_{13}$. During the extension, in the concentric breadth-first search system, the adjacent vertices ($v_2$, $v_4$) of the vertex $v_3$ corresponding to $t\_v_{13}$ are to be searched for. In contrast, in the second embodiment, during search for a next t-vertex through extension of the shortest-path tree from $t\_v_{13}$, an already generated shortest-path tree is utilized, as in the case of the first embodiment. Thus, it is possible to reduce the number of accesses to adjacent vertices.

As described above, when the present disclosure is applied to a directed graph, the generation apparatus according to the second embodiment can also offer substantially the same advantages as those in the first embodiment. The edge between adjacent vertices in an undirected graph can be regarded as an edge that goes out of one vertex and goes into the other vertex and also as an edge that goes out of the other vertex and goes into the one vertex. That is, an undirected graph can be regarded as a directed graph having links in two directions. Thus, the first embodiment for an undirected graph can be said to be a special case of the second embodiment for a directed graph.

The second embodiment is improved over the first embodiment. Examples of the improvements include application to the above-described disconnected graph and unwanted-process reductions due to use of the list Uf_Vertices and so on. In view of the foregoing, these improvements are also easily applicable to the first embodiment.

The first and second embodiments are based on the above-described concentric breadth-first search system utilizing the simple, easy-to-understand breadth-first search system, and thus inherit the simplicity and the ease of understanding.

The amount of calculation when a shortest-path tree is generated according to the first embodiment will be described below for each shape of a graph. The amount of calculation has been experimentally determined, except for (6) below. Thus, the amount of calculation is not the maximum amount of calculation and is an amount of calculation that may be regarded as an average amount of calculation.

1) Complete graph $O(|V|^2)$
2) Complete bipartite graph $O(|V|^2)$
3) Two-dimensional lattice $O(|V|^2)$
4) Hypercube $O(|V|^2)$
5) Random graph $O(|V|^{2.25 \text{ to } 2.3})$
6) Complete quadpartite graph, each portion having $|V|/4$ vertices" $O(|V|^3)$ In the random graph, the number of edges was varied from $|V|$ to $|V|^2/2$, that is, $O(|E|)$ was varied from $O(|V|)$ to $O(|V|^2)$, to perform measurement. Since the amount of calculation in this case may be regarded as an average amount of calculation, it is difficult to make a simple comparison with that in the related art, but the effect of reducing the amount of calculation is exhibited. Although $O(|V|^3)$ and the amount of calculation are involved in (6), a graph having such a form hardly appears in a typical graph, such as a road network.

When the graph to be processed is a directed graph, as in the second embodiment, it is also thought to be possible to offer the effect of reducing the amount of calculation which is equal to or greater than that in the first embodiment. This is because the amount of calculation when the graph to be processed is a directed graph is presumed to be smaller than or equal to the amount of calculation when the graph to be processed is an undirected graph, since an undirected graph can be regarded as a directed graph having links in two directions, as described above.

Although a form in which the generation program 50 or 250 is pre-stored (pre-installed) in the storage unit 43 has been described in each embodiment described above, the generation program 50 or 250 may also be provided in a form in which it is recorded on a storage medium, such as a compact disc read-only memory (CD-ROM) or a digital versatile disc read-only memory (DVD-ROM).

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A method for causing at least one processor to execute a process comprising:
   generating, for each of vertices in a graph that is configured to represent relationships between pieces of data represented by the vertices and edges connecting the vertices so as to cause the data to be searched for by using the graph, a shortest-path tree rooted at a root vertex that is equal to each vertex in the graph so that end-point vertices of each shortest path tree, whose distance from the root vertex is an integer of n equal to or greater than 0, are generated at a same time, the end-point vertex being a vertex positioned at an end point of a shortest path starting from the root vertex, the shortest-path tree representing shortest paths from the root vertex to all the end-point vertices,
   a path between two vertices being a sequence of edges connecting a sequence of adjacent vertices through which the two vertices are connected to each other,
   a length of the path being a number of edges included in the path,
   a shortest path between the two vertices being a path whose length is smallest among all paths between the two vertices,
   a distance between the two vertices being a length of the shortest path between the two vertices, wherein
   generation of a distance N vertex among first vertices in a first shortest path tree, whose distance from a first root vertex is a natural number of N greater than 1 and which is adjacent to a distance N−1 vertex among the first vertices of the first shortest-path tree, whose distance from the first root vertex is N−1, is performed based on searching for zero or more child vertices of a second vertex corresponding to the distance N−1 vertex of the first shortest path tree within a second shortest-path tree rooted at a second root vertex adjacent to the first root vertex, which is located on the shortest path from the first root vertex to the distance N−1 vertex.

2. The method of claim 1, further comprising:
assigning, to each of the vertices constituting the shortest-path tree, an attribute indicating a corresponding vertex that is included in the second shortest-path tree; and
when a vertex in the first shortest-path tree whose distance from the first root vertex is N is generated, setting the attribute at a value indicating the corresponding vertex in the second shortest-path tree.

3. The method of claim 1, wherein,
in a case where the graph is an unweighted directed graph, the second root vertex adjacent to the first root vertex is a vertex into which an edge going out of the first root vertex goes.

4. The method of claim 1, wherein,
in a case where the graph is an unweighted undirected graph, the second root vertex adjacent to the first root vertex is a vertex that is connected with the first root vertex via an edge.

5. The method of claim 2, wherein
a first type of object indicating attributes of a vertex in the graph and a second type of object indicating attributes of a vertex within a shortest-path tree in the graph are managed in association with each other.

6. The method of claim 5, wherein
the first type of object includes, as the attributes, an identifier of a vertex in the graph, information on vertices adjacent to the vertex identified by the identifier, a depth of an already generated shortest-path tree whose root is the vertex identified by the identifier, information on the second type of object corresponding to the first type of object, which indicates the root vertex of the shortest path tree, information on vertices included in the already generated shortest-path tree, and information on vertices, for each distance from the vertex identified by the identifier, which are included in the already generated shortest-path tree; and
the second type of object includes, as the attributes, information on a vertex associated with the second type of object, information on a parent vertex and child vertices of the vertex within the shortest-path tree, and the attribute indicating the corresponding vertex included in the second shortest-path tree.

7. An apparatus comprising:
a processor configured to generate, for each of vertices in a graph that is configured to represent relationships between pieces of data represented by the vertices and edges connecting the vertices so as to cause the data to be searched for by using the graph, a shortest-path tree rooted at a root vertex that is equal to each vertex in the graph so that end-point vertices of each shortest path tree, whose distance from the root vertex is an integer of n equal to or greater than 0, are generated at a same time, the end-point vertex being a vertex positioned at an end point of a shortest path starting from the root vertex,
the shortest-path tree representing shortest paths from the root vertex to all the end-point vertices,
a path between two vertices being a sequence of edges connecting a sequence of adjacent vertices through which the two vertices are connected to each other,
a length of the path being a number of edges included in the path,
a shortest path between the two vertices being a path whose length is smallest among all paths between the two vertices,
a distance between the two vertices being a length of the shortest path between the two vertices, wherein
generation of a distance N vertex among first vertices in a first shortest path tree, whose distance from a first root vertex is a natural number of N greater than 1 and which is adjacent to a distance N−1 vertex among the first vertices of the first shortest-path tree, whose distance from the first root vertex is N−1, is performed based on searching for zero or more child vertices of a second vertex corresponding to the distance N−1 vertex of the first shortest path tree within a second shortest-path tree rooted at a second root vertex adjacent to the first root vertex, which is located on the shortest path from the first root vertex to the distance N−1 vertex.

8. The apparatus of claim 7, wherein
the processor assigns, to each of the vertices constituting the shortest-path tree, an attribute indicating a corresponding vertex that is included in the second shortest-path tree; and
when a vertex in the first shortest-path tree whose distance from the first root vertex is N is generated, the processor sets the attribute at a value indicating the corresponding vertex in the second shortest-path tree.

9. The apparatus of claim 7, wherein,
in a case where the graph is an unweighted directed graph, the second root vertex adjacent to the first root vertex is a vertex into which an edge going out of the first root vertex goes.

10. The apparatus of claim 7, wherein,
in a case where the graph is an unweighted undirected graph, the second root vertex adjacent to the first root vertex is a vertex that is connected with the first root vertex via an edge.

11. The apparatus of claim 8, wherein
the processor manages a first type of object indicating attributes of a vertex in the graph and a second type of object indicating attributes of a vertex within a shortest-path tree in the graph in association with each other.

12. The apparatus of claim 11, wherein
the first object includes, as the attributes, an identifier of a vertex in the graph, information on vertices adjacent to the vertex identified by the identifier, a depth of an already generated shortest-path tree whose root is the vertex identified by the identifier, information on the second type of object corresponding to the first type of object, which indicates the root vertex of the shortest path tree, information on vertices included in the already generated shortest-path tree, and information on vertices, for each distance from the vertex identified by the identifier, which are included in the already generated shortest-path tree; and
the second type of object includes, as the attributes, information on a vertex associated with the second type of object, information on a parent vertex and child vertices of the vertex within the shortest-path tree, and the attribute indicating the corresponding vertex included in the second shortest-path tree.

13. A non-transitory, computer-readable recording medium having stored therein a program for causing a computer to execute a process comprising:
generating, for each of vertices in a graph that is configured to represent relationships between pieces of data represented by the vertices and edges connecting the vertices so as to cause the data to be searched for by using the graph, a shortest-path tree rooted at a root vertex that is equal to each vertex in the graph so that end-point vertices of each shortest path tree, whose distance from the root vertex is an integer of n equal to or greater than 0, are generated at a same time, the end-point vertex being a vertex positioned at an end point of a shortest path starting from the root vertex, the shortest-path tree representing shortest paths from the root vertex to all the end-point vertices, a path between two vertices being a sequence of edges connecting a sequence of adjacent vertices through which the two vertices are connected to each other, a length of the path being a number of edges included in the path, a shortest path between the two vertices being a path whose length is smallest among all paths between the two vertices, a distance between the two vertices being a length of the shortest path between the two vertices, wherein generation of a distance N vertex among first vertices in a first shortest path tree, whose distance from a first root vertex is a natural number of N greater than 1 and which is adjacent to a distance N−1 vertex among the first vertices of the first shortest-path tree, whose distance from the first root vertex is N−1, is performed based on searching for zero or more child vertices of a second vertex corresponding to the distance N−1 vertex of the first shortest path tree within a second shortest-path tree rooted at a second root vertex adjacent to the first root vertex, which is located on the shortest path from the first root vertex to the distance N−1 vertex.

14. The non-transitory, computer-readable recording medium of claim 13, wherein the process further includes:

assigning, to each of the vertices constituting the shortest-path tree, an attribute indicating a corresponding vertex that is included in the second shortest-path tree; and when a vertex in the first shortest-path tree whose distance from the first root vertex is N is generated, setting the attribute at a value indicating the corresponding vertex in the second shortest-path tree.

15. The non-transitory, computer-readable recording medium of claim 13, wherein, in a case where the graph is an unweighted directed graph, the second root vertex adjacent to the first root vertex is a vertex into which an edge going out of the first root vertex goes.

16. The non-transitory, computer-readable recording medium of claim 13, wherein, in a case where the graph is an unweighted undirected graph, the second root vertex adjacent to the first root vertex is a vertex that is connected with the first root vertex via an edge.

17. The non-transitory, computer-readable recording medium of claim 14, wherein a first type of object indicating attributes of a vertex in the graph and a second type of object indicating attributes of a vertex within a shortest-path tree in the graph are managed in association with each other.

18. The non-transitory, computer-readable recording medium of claim 14, wherein the first type of object includes, as the attributes, an identifier of a vertex in the graph, information on vertices adjacent to the vertex identified by the identifier, a depth of an already generated shortest-path tree whose root is the vertex identified by the identifier, information on the second type of object corresponding to the first type of object, which indicates the root vertex of the shortest path tree, information on vertices included in the already generated shortest-path tree, and information on vertices, for each distance from the vertex identified by the identifier, which are included in the already generated shortest-path tree; and the second type of object includes, as the attributes, information on a vertex associated with the second type of object, information on a parent vertex and child vertices of the vertex within the shortest-path tree, and the attribute indicating the corresponding vertex included in the second shortest-path tree.

* * * * *